3,316,260
DERIVATIVES OF ALPHA AMINO-INDOLE-3-
ACETIC AND PROPIONIC ACIDS
Tsung-Ying Shen, Westfield, N.J., assignor to Merck &
Co., Inc., Rahway, N.J., a corporation of New Jersey
No Drawing. Filed Oct. 24, 1965, Ser. No. 505,036
14 Claims. (Cl. 260—247.2)

This application is a continuation-in-part of my copending application, Ser. No. 334,692, filed Dec. 31, 1963.

This invention relates to new chemical compounds. More particularly, it relates to a new class of compounds of the indole series. Still more particularly, it relates to α-amino substituted 3-indolyl-lower aliphatic acids having an aromatic carboxylic acyl radical of less than 3 fused rings attached to the nitrogen atom of the indole ring and with salts, amides, anhydrides and esters of such compounds. The new α-amino acyl indolyl lower aliphatic acid compounds of this invention have the general structural formula:

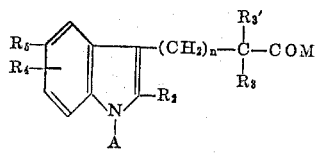

in which $n$ is 0 or 1, i.e., an integer less than 2;

$R_2$ is hydrogen or a hydrocarbon radical having less than nine carbon atoms, including for example, lower alkenyl lower alkyl, cycloalkyl, aryl and aralkyl radicals;

$R_3$ is amino, lower monoalkylamino, lower dialkylamino, benzylamino, N-lower alkyl benzylamino, cyclohexylamino, pyrrolidino, piperidino, tetrahydropyridino, morpholino, piperazino, acetyl-piperazino, N'-methylpiperazino, N-(β-hydroxyethyl)-piperizino, β-dilower-alkylamino-ethylamino, N-diethanolamino and β-hydroxyethylamino;

$R_3'$ is hydrogen, lower alkyl or lower alkenyl;

$R_4$ is hydrogen, lower alkyl, lower alkoxy, fluorine and trifluoromethyl;

$R_5$ is hydrogen, hydroxy, lower alkyl, lower alkoxy, nitro, amino, lower alkylamino, di(lower alkyl) amino, lower alkanoylamino, lower alkanoyl, bis(hydroxy lower alkyl) amino, pyrrolidino, N-methylpiperazinyl, morpholinyl, cyano, trifluoromethyl, halogen, di(lower alkyl) sulfamyl, benzylthio, lower alkylbenzylthio, lower alkoxybenzylthio, halogenobenzylthio, benzyloxy, lower alkylbenzyloxy, lower alkoxybenzyloxy, halogenobenzyloxy, lower alkenyl, lower alkenyloxy, hexamethyleneamino, cyclopropyl, cyclopropyl (lower alkoxy) and cyclobutyl (lower alkoxy);

A is a substituted or unsubstituted homocylic or heterocyclic carboxylic acyl radical, preferably containing less than three fused rings, more specifically, an aroyl radical of the formula ArC=O, where Ar is, for example, a benzene, naphthalene, biphenyl or a substituted benzene, naphthalene or biphenyl radical in which the substituent may be halogen, lower alkyl, lower alkoxy, trifluoromethyl, trifluoroethyl, perfluoroethyl, β-chloroethyl, phenoxy, lower alkylphenoxy, lower alkoxyphenoxy, halogenophenoxy, diloweralkylaminoacetyl, halogenoacetyl, benzoyl, phenylacetyl, trifluoroacetyl or other like acyl groups, di (lower alkyl) sulfamyl, cyano, carb-lower alkoxy or a derivative thereof, such as an alkali metal salt or a lower alkyl ester of the carboxy radical, aldehyde, azide amide, hydrazide, acetals, thioacetals, trifluoro-methylthio or other haloalkylthio, lower alkylsulfinyl, lower alkylsulfonyl, sulfonamido, mercapto or substituted mercapto such as methylthio, propylthio, arylthio, aralkylthio, lower alkylbenzyl- thio, lower alkoxybenzylthio, halogenobenzythio, nitro, amino, di(lower alkyl)amino, lower alkylamino, lower alkanoylamino, acylamino, amine oxide, ketimines, urethanes, amidine, acylated amidine, hydrazine, substituted hydrazine, alkoxyamines, sulfonated amines, hydroxy, lower alkanoyloxy, haloacetoxy, benzyloxy, lower alkylbenzyloxy, lower alkoxybenzyloxy and halogenobenzyloxy, or the formula HetC=O, wherein Het represents a five- or six-membered heteroaromatic ring which may be part of a ring system containing less than three fused rings, for example furyl, isonicotinyl, thienyl, pyrryl, thiazolyl, thiadiazolyl, pyrazinyl, pryidinyl, quinolyl, isoquinoyly, pyrazolyl, imidazolyl, oxazolyl, pyrimidinyl or a benz derivative thereof such as benzisooxoazolyl, benzimidazoyly, benzolfuranyl, benzothiazolyl, benzotriazolyl, benzoxazolyl, benzothienyl, indazolyl and isoindazolyl; and M is hydroxyl, amino, methylamino, ethylamino, propylamino, butylamino, dimethylamino, diethylamino, N-methyl-N-ethylamino, N-methyl-N-butylamino, dibutylamino, glucosamino, glycosylamino, allylamino, N-phenethylamino N-ethyl-N-phenethylamino, p-chloroanilino, β(1 - ethylpiperidyl - 2)ethylamino tetrahydrofurfurylamino, 1,2,5,6-tetrahydropyridino, morpholino, N-methyl piperazino, piperazino, N-phenyl-piperazino, piperidino, benzylamino, anilino, p-ethoxy-anilino, cyclohexylamino, pyrrolidino, N-hydroxy-ethyl-piperazino, N,N-dimethylcarbamylmethylamino, N,N - diethylamino-ethylamino, benzyloxy, lower alkoxy, p-methoxyanilino (1-methylpyrrolidyl - 2)methylamino, N-carbobenzyloxymethylamino, ethoxyethoxy, phenoxy, di-phenylmethoxy, triphenylmethoxy, cyclopropyloxy, β-diethylaminoethoxy, β-dimethylaminoethoxy, β-acetaminoethoxy, phenethoxy, allyloxy, isopropoxy, cyclopropylmethoxy, tetrahydrofurfuryloxy, cyclohexyloxy, cyclopentyloxy, cyclopropylethoxy, p-acetaminophenoxy, o-carboxy-phenoxy, polyhydroxy lower alkyl such as glycerol, polyhydroxy cycloalkyl such as inositol and 1,4-cyclohexanediol, polyalkoxy lower alkyl such as the polyalkyl ethers derived from sorbitol, mannitol or other sugar alcohols containing up to six carbon atoms in the basic chain, cyclic lower alkylamino lower alkyl radicals such as N-(β-hydroxyethyl) morpholino; M also includes OZ, where Z is a cation including metals such as alkali or alkaline earth metals, or OY where Y is lower alkyl, aryl or a group of the formula formula

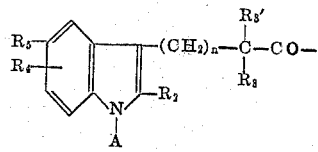

wherein $n$, A, $R_2$, $R_3$ $R_3'$, $R_4$ and $R_5$ are as defined above.

The invention also includes within its scope compounds where M is a cyclic lower alkylamino lower alkyl radical derived from N-(β-hydroxyethyl) piperidine, N-(β-hydroxyethyl) pyrrolidine, N-(hydroxymethyl) pyrrolidine, N-(β-hydroxyethyl) morpholine, 4-dimethylamino-cyclohexyl, N-methyl-2-hydroxymethyl pyrrolidine, N-methyl-2-hydroxymethyl piperidine, N - ethyl - 3 - hydroxy-piperidine, 3-hydroxyquinuclidine and N-(β-hydroxyethyl)-N-methyl-piperazine.

The 2-position of the indole ring nucleus ($R_2$ in the above formula) may be hydrogen although it is preferred that there be present at this position of the molecule a hydrocarbon radical having less than nine carbon atoms. Lower alkyl groups such as methyl, ethyl, propyl or butyl are the most satisfactory, but compounds substituted with lower alkenyl radicals or aryl radicals such as phenyl are also useful.

This invention also relates to processes for the preparation of the above-mentioned compounds.

Lower alkyl esters, salts, anhydrides and the amides of these aliphatic acids represent an additional aspect of the invention. The esters are important intermediates in the synthesis of the free acids, and in many cases are themselves of importance as end products. The preferred esters are the lower alkyl and alkaryl esters such as methyl, ethyl, propyl, t-butyl, benzyl and ilke esters.

The salts of the new α-(1-aroyl or heteroaroyl-3-indolyl)-lower aliphatic acids can be obtained by treatment of the free acid with base under mild conditions. In this manner there may be obtained metal salts such as sodium, potassium, aluminum, magnesium, barium and calcium salts. Salts of organic amines such as dimethylamine, morpholine, methyl cyclohexylamine or glucosamine may be obtained by reacting the acid with the appropriate organic base. The amides included within this invention are conveniently synthesized by treating a 1-acylated-3-indolyl-α-amino aliphatic acid anhydride or an α-substituted amino acid anhydride with ammonia or a primary or secondary amine. The anhydrides are produced by the reaction of 1-acylated-3-indolyl-α-amino (substituted or unsubstituted) lower aliphatic acids with a mild dehydrating agent such as dicyclohexyl carbodiimide.

The (1-aroyl or heteroaroyl) 3-indolyl lower aliphatic α-amino acid compounds of this invention have a high degree of anti-inflammatory activity and are effective in the prevention and inhibition of edema and granuloma tissue formation. Certain of them possess this activity in high degree and are of value in the treatment of arthritic and dermatological disorders and in like conditions which are responsive to the treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–4000 mg. per day are useful in control of arthritic conditions, depending on the activity of the specific compound and the reaction sensitivity of the patient.

It is an advantage of this invention that substitution at the N-1 position with an acyl group in an α-amino-3-indolyl lower aliphatic acid compound imparts anti-inflammatory activity to the previously nonactive compound.

The 1-(aroyl and heteroaroxyl) lower aliphatic α-amino acids and derivatives thereof described herein are synthesized by acylation of an acid, amide or ester having the desired substituents at the appropriate positions on the indole nucleus. It is preferred to carry out the acylation step on an ester derivative of the indole acid. In those cases where the free acid is desired, the ester may be converted under suitable reaction conditions to the free acid.

It has been observed that the 1-aroyl or heteroaroyl substituent is easily hydrolyzed under conditions normally employed for saponification of an ester to the free acid. For this reason, care must be taken in converting the esters to the corresponding free acids. It has been found that one convenient method of accomplishing this conversion comprises acylation of the benzyl ester and subsequent hydrogenolytic removal of the benzyl ester. Alternatively, other esters such as the t-butyl esters, which are amenable to selective removal by other treatment, such as heating above 210° C. or by heating at 25–110° C. in the presence of a catalytic amount of an aryl sulfonic acid or other acids may be utilized.

The acylation reaction is preferably conducted by treating the starting material with an alkali metal hydride such as sodium hydride to form, e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. These esters are prepared by mixing the acid and p-nitrophenol in tetrahydrofuran and adding dicyclohexyl carbodiimide in tetrahydrofuran slowly. The dicyclohexylurea which forms is removed by filtration and the nitrophenylester is recovered from the filtrate. Alternatively, there can also be used the anhydride, azide or thiophenolic ester of the acylating acid. Whichever agent is used the acylation of the ester starting material is achieved by forming an alkali metal salt of the ester with, for example sodium hydride, in an anhydrous solvent and adding the acylating agent.

The various processes of this invention for the preparation of the 3-indolyl lower aliphatic acid compounds are indicated in Flow Sheet II as A, B, C, D, E, and F. The substituted indoles of the formula:

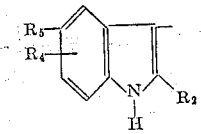

where $R_2$, $R_4$ and $R_5$ have the previously defined meaning (with the exception that each group must be compatible with the process in question, if protection of the group cannot be obtained) are used as the starting materials to carry out Process A. In addition, this indole is also used to prepare the starting material of several of the other processes. The starting material used to carry out Process B (when $n=0$) is prepared by a process which comprises reacting the above-identified substituted indole with oxalyl chloride to produce the indolyl acetic acid chloride. This acid chloride may be treated with a lower alkyl alcohol, benzyl alcohol, ammonia or primary and secondary amines to produce (the starting material) the ester or amide of the indole glyoxalic acid compound. When $n=1$, Process B uses a starting material produced by reaction shown as sequence 2 in Flow Sheet I. A phenylhydrazine and a levulinic compound form an intermediate phenylhydrazone, which may be isolated or converted in situ to an indole. (If the 2-position radical is hydrogen, it is preferred to employ an aldehyde in the form of an acetal, e.g., methyl-γ,γ-dimethoxybutyrate).

Acid addition salts of the phenylhydrazine reactant, for example, the hydrochloride, are normally preferred over the free base, since they are more stable, although such salts and the bases from which they are derived are equivalent in reaction itself. The substituted phenylhydrazines employed are prepared by known methods. A preferred method uses diazotization of the appropriately substituted aniline, followed by successive treatments with stannous halide to form a tin complex and sodium hydroxide to convert the complex to a phenylhydrazine.

The indolyl acetic ester thus prepared is reacted with an alkali alcoholate and an oxalate to form an alkoxalyl indole ester which in turn is hydrolyzed to an indole pyruvic acid, one of the starting materials for step 6.

The starting materials used to carry out Process C are the N-1-aroyl and heteroaroyl derivatives of the above acids and alkali salts. These latter compounds are prepared by pyrolysis of a tertiary butyl 1-aroyl or heteroaroyl substituted-3-indolyl-glyoxalic or pyruvic ester, to yield the free acid, and treatment of the free acid with an alkali base to obtain the acid salt. The starting materials used to carry out Process D are prepared by N-1-acylation of the previously identified substituted indole compounds. (The preparation of all the starting materials is described in Flow Sheet I.)

In accordance with this invention, treatment of an N-1 aroyl or heteroaroyl-substituted-3-indolyl-glyoxalic acid, ester, amide, substituted amide or alkali salt with hydroxylamine produces the corresponding oxime, which, on subsequent reduction, yields an α-amino-1-aroyl or heteroaroyl-substituted-3-indolyl lower aliphatic acid compound of this invention. (This process is indicated in Flow Sheet II as Process C.) Additional compounds of this invention may be prepared by treatment of the above mentioned products (1-aroyl-or heteroaroyl-substituted-3-indolyl-α-amino-lower aliphatic acid compounds) with an alkyl halide to yield the corresponding α-substituted amino compounds. (This process is indicated as Process E in Flow Sheet II.)

The process of this invention for preparing the α-amino, α-mono and di-substituted amino-N-1 aroyl or heteroaroyl-substituted-3-indolyl acetic acid compounds of this invention comprises treatment of the appropriately substituted indole with an amine base (such as ammonia, mono or disubstituted amine) and a glyoxalic acid compound (such as glyoxalic acid, its ester, amide, substituted amide or alkali salt). (This process is indicated in the Flow Sheet as Process D.) This last process is employed where mono and disubstituted amines are desired, where the other processes are inadequate to prepare substituents in the α-amino group. Furthermore, where the substituents on the indole compound are those which will be effected by the reduction step of the first mentioned process, such as nitro, cyano and the like, as well as those groups which may hamper or completely prevent the reduction, this last indicated process is also employed.

Alternatively, the di-substituted amino N-1-substituted-3-indolyl lower aliphatic acid compounds of this invention may be prepared by treating (when $n=0$) the previously indicated N-1 unsubstituted indole with a lower alkyl glyoxalate, benzy glyoxalate, glyoxalamide or substituted glyoxalamide and a di-substituted amine to produce the N-1 unsubstituted-3-indolyl-α-di-substituted amino lower aliphatic acid compound.

However, when $n=1$, the reaction is accomplished by treating N-1 unsubstituted indole under Mannich reaction conditions with a formaldehyde-dialkylamine reagent to produce a substituted gramine, subsequently reacting this compound with a 2-nitro propionate ester in a reaction inert solvent and hydrolyzing with a strong base such as sodium or potassium hydroxide. Either process is then followed by acylation (this is Process A in Flow Sheet II).

While this method of introducing the aliphatic acid residue at the three position after elaboration of the indole ring is, of course, generally applicable to compounds having the structure shown above, it is particularly useful for making compounds of this invention wherein $R_2$ is an alkyl radical other than methyl, such as ethyl, propyl and allyl.

A still further process for preparing an α-amino-N-1-aroyl-substituted-3-indolyl lower aliphatic acid compound of this invention (indicated as Process B in Flow Sheet II), comprises treatment of an N-1 unsubstituted-3-indolyl oxime ester, amide or substituted amide with benzyloxyamine to produce the corresponding benzyloximino compound, acylation of this compound at the N-1 position and reduction of this acylated compound to produce α-amino-N-1-substituted-3-indolyl lower aliphatic acid.

Alternately, Process B may proceed from the acid starting material through the anhydride to a readily removable ester of the indole before treatment with benzyloxyamine to produce the same compound.

The preparation of the anhydride of this invention comprises the reaction of a 1-acyl-3-indolyl-α-disubstituted amino lower aliphatic acid with a dehydrating agent, to produce the anhydrides of the invention (Processes F and G in the Flow Sheet).

Finally, an alternative procedure for preparing the free acids of the compounds of this invention comprises pyrolysis of the t-lower alkyl ester. (Indicated as Process H in Flow Sheet II.)

The 1-acyl group of the products of this invention is, as has been mentioned earlier, easily hydrolyzed under the conditions normally used to saponify an ester. An alternate method to that described above for obtaining substituted α-amino aliphatic acid is to esterify the free 1-unsubstituted lower aliphatic acid with benzyl alcohol in an inert solvent with an acid catalyst (sulfuric, aryl, sulfonic acids, etc.), acylate the indole nitrogen and remove the benzyl group by hydrogenolysis, a process which leaves the 1-acyl group untouched.

The previously defined 1-unsubstituted indoles are readily prepared following the procedures set forth in columns 2 and 3 of U.S. Patent No. 2,825,734. Products where $R_5$ is acyloxy, halo, cyano, carboxy, carbalkoxy, N,N-diloweralkyl carbamyl, alkyl, aryl, aralkyl, nitro or hydrocarbonoxy are prepared via the synthesis beginning from a substituted 2-nitro benzaldehyde or 2-nitrotoluene.

The synthesis of various compounds of this invention having on the indole ring system and $R_5$-substituent which has a nitrogen attached to the homocyclic ring of the indole is generally based on the 5-nitro compound. This is transformed into the desired $R_5$-substituent. Such transformation may take place either before or after acylation of the 1-position, depending on the extent to which the desired 5-substituent may interfere with the acylation. If such interference is possible, the 1-acylation should be carried out on the 5-nitro indole and the nitro later transformed into the desired 5-substituent. Such transformation can be carried out in a number of ways. Reduction of the 5-nitro groups gives a 5-amino group. Reaction of the amino with alkyl halides gives mono and dialkyl amino groups. If the alkyl halide is a dihaloalkylene group (i.e., 1,4-dibromo-butane) a heterocyclic ring (e.g., pyrrolidino) is formed. Similarly, bis (β-chlorethyl) ether will give an N-morpholino compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds. Free mercapto groups likewise will interfere with the acylation and should be formed after such a step or protected by conversion to an alkyl or aralkyl thio group.

The α-amino group on the side chain must be protected throughout these 5-substituent reactions by means of a blocking group, such as the benzyloximino group above illustrated. Thus the protecting effect of the benzyloximino or radicals of similar function, e.g., trifluoromethyl, benzal, carbobenzyloxy, will allow acylation at the N-1 position and also substitution reactions on the 5-position group. And when the 5-amino and α-amino groups exist concurrently, reactions with alkyl halides (as above) will give di(mono and dialkyl) amino groups.

The preferred compounds of this invention are those which contain hydrogen or methyl at the $R_2$ position, amino, dimethylamino, morpholino, pyrrolidino and piperidino at the $R_3$ position, hydrogen at the $R_3'$ position, methyl, hydrogen or fluoro at the $R_4$ position, methoxy, methyl, dimethylamino, fluoro, benzyloxy or hydroxy at the $R_5$ position and p-chlorobenzoyl or p-methylthiobenzoyl and p-trifluoromethylbenzoyl at the A position. The following compounds are indicative of the preferred compounds as well as other indolyl-lower-aliphatic acids and derivatives which are prepared by the procedures discussed above:

1-p-chlorobenzoyl-2-methyl-5-methoxy-3-indolyl-α-amino acetic acid;

1-p-chlorobenzoyl-2-methyl-5-methoxy-3-indolyl-α-dimethylamino acetic acid;

p-methylthiobenzoyl-2-methyl-5-methoxy-3-indolyl-α-amino acetic acid;
p-chlorobenzoyl-2-methyl-5-methyl-3-indolyl-α-amino acetic acid;
p-chlorobenzoyl-2-methyl-5-methoxy-3-indolyl-α-N-morpholino acetic acid;
p-methylthiobenzoyl-2-methyl-5-fluoro-3-indoyl-α-N-piperidino acetic acid;
thyl-1-p-trifluoromethylbenzoyl-2-methyl-5-methoxy-3-indolyl-α-N-morpholino acetate;
p-chlorobenzoyl-2-methyl-5-methoxy-3-indolyl-α-N-pyrrolidino acetic acid;
p-chlorobenzoyl-2-methyl-5-dimethylamino-3-indolyl-α-amino acetic acid;
t-Acetaminoethyl-α-[1(p-dimethylaminoacetylbenzoyl) 2-isopropenyl-5-(p-chlorobenzyloxy)-6-ethyl-3-indolyl] α-vinyl-α[N'-(β-hydroxyethyl)-N-piperazino]acetate;
β[1-(p-trifluoromethylbenzoyl)-2-(n-propyl)-4-trifluoromethyl-5-fluoro-3-indolyl]-α-(β-hydroxyethylamino) propionic acid;
β[1-p-(4'-methoxybenzylthiobenzoyl-2-(pent-1-en)-5-(1'-pyrrolidino)-3-indolyl]-α-amino propionic acid;
2-dimethyl-3-diethylaminopropyl-β-[1-(N,N-dimethyl-p-sulfonamido-benzoyl)-2-phenyl-5-(1-azacyclopropyl)-7-methoxy-3-indolyl]-α-(β-dimethylaminoethylamino) α-ethylpriopionate;
t-Butyl-β-[1-(4-thiazolecarbonyl)-2-(n-propyloxy)-5-dipropylsulfamyl-3-indolyl]-α-(1'-pyrrolidino) propionate;
β-Diethylaminoethyl-β-[1-(2'-furoyl)-2-cyclopropyl-5-benzylthio-3-indolyl]-α-cyclohexylamino-α-isobutyl propionate;
N-phenylpiperazinyl-β-[1-(1-methylimidazol-5-carboxy) 2-benzyl-5-cyclopropylmethyloxy-3-indolyl]-α-amino-propionamide;
β[1-(1-methyl-6-nitro-indazole-3-carboxy)-2-(t-butyl)-5-ethylbenzyloxy-3-indolyl]-α-amino propionic anhydride;
β[1-(p-dimethylsulfamylbenzoyl)-2-isobutyl-5-(4-morpholinyl)-3-indolyl]-α-amino-α-methyl propionic acid;
p-chlorobenzoyl-β-[1-(β-naphthoyl)-2-(m-tolyl)-5-isobutyloxy-3-indolyl]-α-(N'-methyl-N-piperazino)-α-(n-propyl)propionate;
N-carbobenzyloxymethylamino-β-[1-(1,3-dimethyl-2,3-dihydro-2-oxoimidazol-4-carboxy)-2-(2,2,3-trimethyl-butyl)-5-chloro-3-indolyl]-α-(N-tetrahydropyridino)-α-(t-butyl) propionamide.

FLOW SHEET I.—PREPARATION OF THE STARTING MATERIALS

Sequence 2

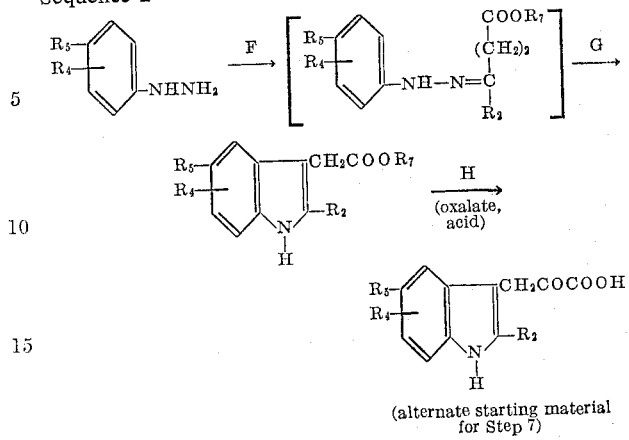

(alternate starting material for Step 7)

*Equivalents* n, $R_2$, $R_4$, $R_5$, and A as defined in specifications with those groups excepted which will be affected by the process in question.

R=OH, $NH_2$, O(alkali cation), lower alkoxy (e.g., methoxy) benzyloxy or N(mono and disubstituted radicals of the type herein described).

$R_7$=$NH_2$, substituted $NH_2$ or lower alkoxy (e.g., methoxy).

*Reactions and conditions*

Step A.—Reaction with oxalyl chloride at low temperatures in an inert solvent such as benzene, toluene, ether, chloroform and the like to produce the indolyl glyoxalyl chloride compound and reaction of this compound with a lower alkyl alcohol, benzyl alcohol, lower alkyl benzyl alcohol, ammonium hydroxide, N-(mono and disubstituted radical), water and alkali base until the reaction is substantially complete.

Step B.—Same as Step A, except water, and an alkali base would not be used.

Step C.—Reaction with a compound such as a mixed anhydride of benzoic acid and a strong inorganic acid or a mixed anhydride of benzoic acid and an organic acid (preferably a mixed anhydride of benzoic acid and a strong inorganic acid) in the presence of a strongly basic condensing agent.

Step D.—Same as Step C.
Step E.—Same as Step A.

Sequence 1

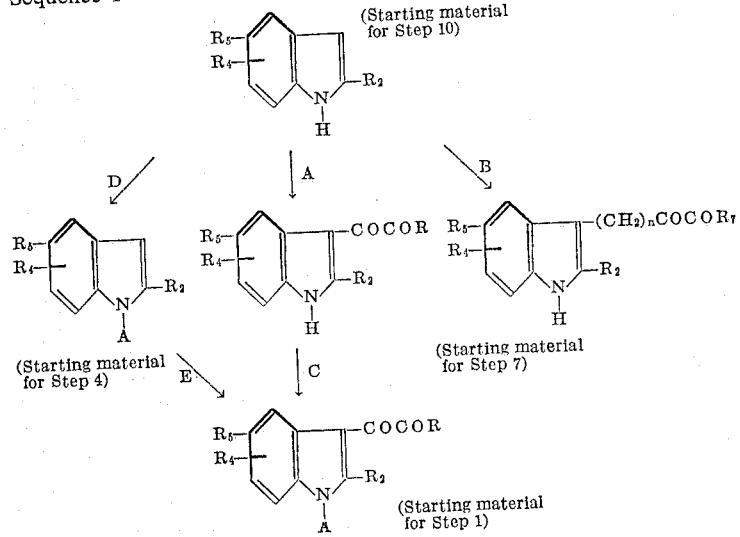

*Step F.*—Reaction with a levulinic compound or a β-acyl propionic derivative in an inert solvent or solvent mixture such as polaroxygenated solvents, suitably lower alkanols. If an ester is used, the alcohol selected is preferably one with the same alkoxy group as the ester, to avoid the possibility of transesterification.

*Step G.*—Carried out in the presence of acidic catalysts, with mineral acids such as hydrochloric and sulfuric being especially suitable, but also including Lewis acids such as aluminum chloride, boron trifluoride, stannic chloride and the like. Both this step and F are carried out at a temperature from about 50° C. to about 120° C. (the reflux temperature of the solvent being most convenient) for a period from about one to about twenty-four hours.

*Step H.*—Accomplished with an alkali alcoholate and an oxalic ester, at room temperatures in a lower alkanol solvent, with subsequent hydrolysis at the boiling point of the acid reactant. When esterified and acylated, the product of this step is the starting material for Process C, when $n=1$.

FLOW SHEET II.—PREPARATION OF COMPOUNDS OF THIS INVENTION

Process A

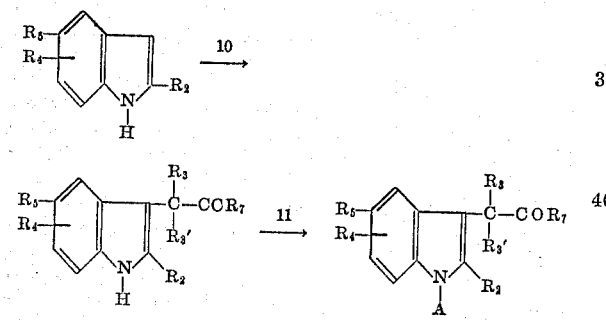

Process B

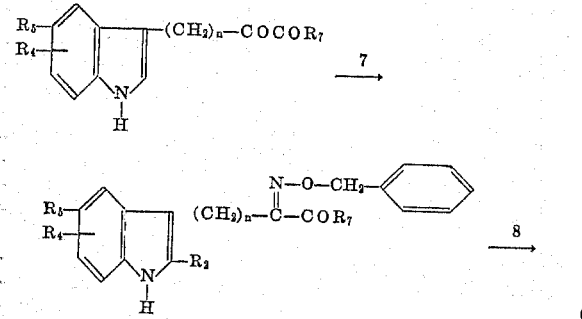

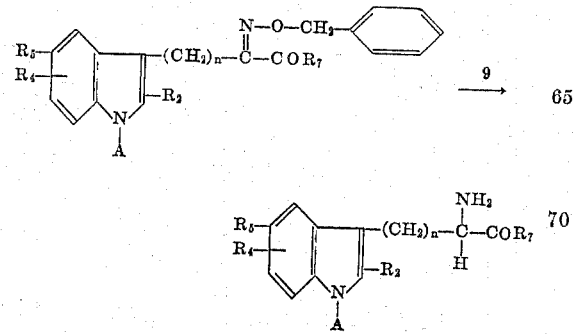

Process C

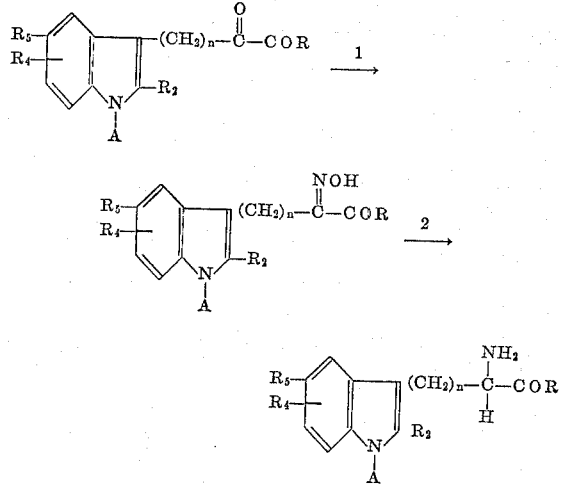

Process D

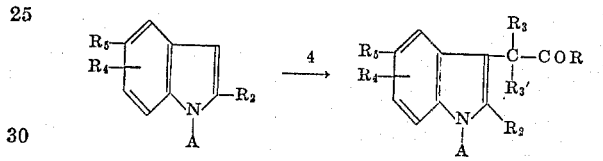

Process E

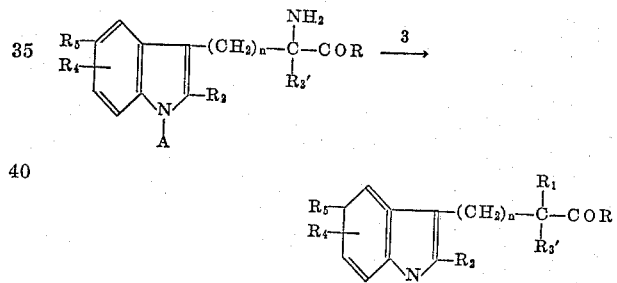

Process F

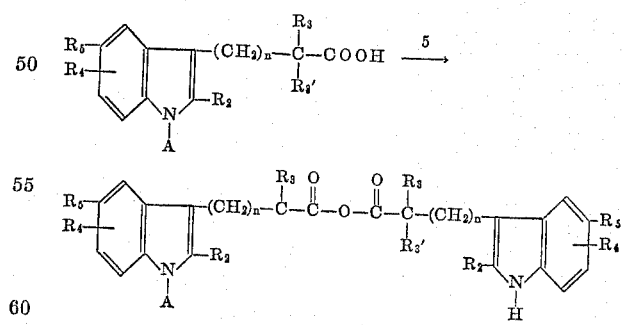

Process G

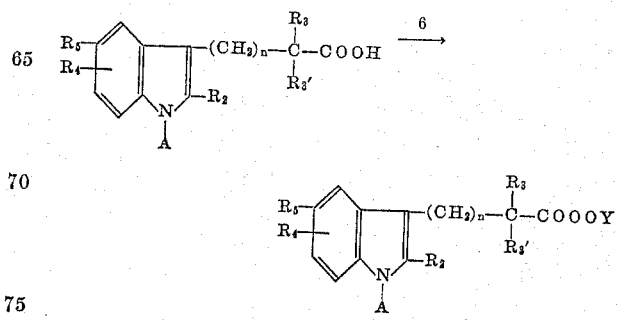

Process H

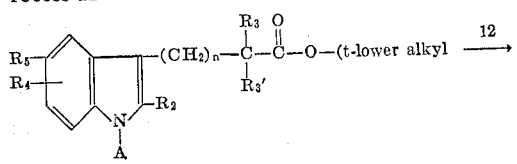

*Equivalents*

$R_2$, $R_4$, $R_5$, and A—for the reactions of Process A are as previously defined with exception that all groups affected by acylation and all primary and secondary amino groups are not included. Because of this restriction, only the following groups are included:

$R_2$ may be hydrogen or lower alkyl;
$R_3'$ may be hydrogen, lower alkyl or lower alkenyl;
$R_4$ may be hydrogen, lower alkyl, lower alkoxy, fluorine or trifluoromethyl;
$R_5$ may be hydrogen, lower alkyl, lower alkoxy, nitro, di(lower alkyl) amino, lower alkanoyl, 1-pyrrolidino, 4-methyl-1-piperazinyl, 4-morpholinyl, cyano, trifluoromethyl, halogen, di(lower alkyl) sulfamyl, benzylthio, loweralkylbenzylthio, lower alkoxybenzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropyl (lower alkoxy) or cyclobutyl (lower alkoxy) and dimethylsulfamyl;
$R_7$ may be $NH_2$, methylamino, ethylamino, propylamino, butylamino, dimethylamino, diethylamino, methylethylamino, methylbutylamino, dibutylamino, allylamino, phenethylamino, N-ethylphenethylamino, p-chloroanilino, 1-ethyl-2-aminomethyl piperidino, tetrahydrofurfurylamino, 1,2,5,6-tetrahydropyridino, morpholino, N-methyl piperazino, piperazino, N-phenylpiperazino, piperidino, benzylamino, anilino, p-ethoxyanilino, cyclohexylamino, pyrrolidino, N-hydroxyethylpiperazino, N,N-dimethylcarboxamidomethylamino, N,N-diethylaminoethylamino, benzyloxy or lower alkoxy; and
$R_8$ may be lower dialkylamino, cyclohexylamino, N-pyrrolidino, N-piperidino, N-tetrahydropyridino, N-morpholino, N-lower alkyl piperazino, acetyl-N-piperazino, or β-diloweralkylamino-ethylamino;

$n$, $R_2$, $R_4$, $R_5$ and A—for the reactions of Process B are as previously defined with the exception that all groups which will be effected by reduction are not included. Because of this restriction, only the following groups are included:

$R_2$ may be hydrogen, or lower alkyl;
$R_4$ may be hydrogen, lower alkyl, lower alkoxy, fluorine or trifluoromethyl;
$R_5$ may be hydrogen, hydroxy, lower alkyl, lower alkoxy, amino, di(lower alkyl) amino, lower alkanoyl, bis(hydroxy lower alkyl) amino, 1-pyrrolidino, 4-methyl-1-piperazinyl, 4-morpholinyl, amino lower alkyl, trifluoromethyl, halogen, di(lower alkyl) sulfamyl, benzylthio, lower alkylbenzylthio, lower alkoxybenzylthio, halogenobenzylthio, 1-azacyclopropyl, cyclopropyl (lower alkoxy) methyloxy and cyclobutyl (lower alkoxy) methyloxy and dimethylsulfamyl; and
$R_7$ may be $NH_2$, methylamino, ethylamino, propylamino, butylamino, dimethylamino, diethylamino, methylethylamino, methylbutylamino, dibutylamino, glucosamino, glycosylamino, allylamino, phenethylamino, N-ethylphenethylamino, p-chloranilino, 1-ethyl-2-aminomethyl piperidino, tetrahydrofurfurylamino, 1,2,5,6-tetrahydropyridino, morpholino, N-methyl piperazino, piperazino, N-phenylpiperazino, piperidino, benzylamino, anilino, p-ethoxyanilino, cyclohexylamino, pyrrolidino, N-hydroxyethylpiperazino, N,N-dimethylcarboxamidomethylamino, N,N-diethylaminoethylamino, lower alkoxy or hydroxy:

$n$, $R_2$, $R_4$, $R_5$ and A—for the reactions of Process C are as previously defined with the exception that all groups which are affected by acylation and/or reduction and cannot be protected are not included.

$R_2$ may be hydrogen or lower alkyl;
$R_4$ may be hydrogen, lower alkyl, lower alkoxy, fluorine or trifluoromethyl;
$R_5$ may be hydrogen, hydroxy, lower alkyl, lower alkoxy, amino, di(lower alkyl) amino, lower alkanoyl, bis(hydroxy lower alkyl) amino, 1-pyrrolidino, 4-methyl-1-piperazinyl, 4-morpholinyl, trifluoromethyl, halogen, di(lower alkyl) sulfamyl, benzylthio, lower alkylbenzylthio, lower alkoxybenzylthio, halogenobenzylthio, 1-azacyclopropyl, cyclopropyl (lower alkoxy) methyloxy or cyclobutyl-(lower alkoxy) methyloxy, and dimethylsulfamyl;
R may be OH, $NH_2$, methylamino, ethylamino, propylamino, butylamino, dimethylamino, diethylamino, methylethylamino, methylbutylamino, dibutylamino, glucosamino, glycosylamino, allylamino, phenethylamino, N-ethylphenethylamino, p-chloroanilino, 1-ethyl-2-aminomethyl piperidino, tetrahydrofurfurylamino, 1,2,5,6-tetrahydropyridino, morpholino, N-methyl piperazino, piperazino, N-phenylpiperazino, piperidino, benzylamino, anilino, p-ethoxyanilino, cyclohexylamino, pyrrolidino, N-hydroxyethylpiperazino, N,N-dimethylcarboxamidomethylamino, N,N-diethylaminoethylamino, benzyloxy, lower alkoxy, OZ (where Z is a cation):

$R_2$, $R_4$, $R_5$ and A—for the reaction of Process D are as previously defined with the exception that all primary and secondary amino groups are not included. Because of this restriction, only the following groups are included:

$R_2$ may be hydrogen, lower alkenyl or lower alkyl;
$R_3$ may be amino, lower monoalkylamino, lower dialkylamino, benzylamino, lower alkyl benzylamino, cyclohexylamino, N-pyrrolidino, N-piperidino, N-tetrahydropyridino, N-morpholino, N-piperazino, acetyl-N-piperazino, β-diloweralkylamino ethylamino or N-diethanolamino;
$R_3'$ may be hydrogen, lower alkyl or lower alkenyl;
$R_4$ may be hydrogen, lower alkyl, lower alkoxy, fluorine or trifluoromethyl;
$R_5$ may be hydrogen, hydroxy, lower alkyl, lower alkoxy, nitro, di(lower alkyl) amino, lower alkanoyl, 1-pyrrolidino, 4-methyl-1-piperazinyl, 4-morpholinyl, cyano, trifluoromethyl, halogen, di(lower alkyl) sulfamyl, benzylthio, lower alkylbenzylthio, lower alkoxybenzylthio, halogenobenzylthio, benzyloxy, lower alkylbenzyloxy, lower alkoxybenzyloxy, halogenobenzyloxy, lower alkenyl, lower alkenyloxy, 1-azacyclopropyl, cyclopropyl (lower alkoxy) or cyclobutyl (lower alkoxy) and dimethylsulfamyl; and
R may be OH, $NH_2$, methylamino, ethylamino, propylamino, butylamino, dimethylamino, diethylamino, methylethylamino, methylbutylamino, dibutylamino, glucosamino glycosylamino, allylamino, phenethylamino, N-ethylphenethylamino, p-chloroanilino, 1-ethyl-2-aminomethyl piperidino, tetrahydrofurfurylamino, 1,2,5,6-tetrahydropyridino, morpoholino, N-methyl piperazino, piperazino, N-phenylpiperazino, piperazino, benzylamino, anilino, p-ethoxyanilino, cyclohexylamino, pyrrolidino, N-hydroxyethylipepärizino, N,N-dimethylcarboxamidomethylamino, N,N-diethylaminoethylamino, benzyloxy, lower alkoxy, OZ (where Z is a cation):

$n$, $R_2$, $R_3$, $R_3'$, $R_4$, $R_5$ and A—for the reaction of Process F are as previously defined, with the exception that no active replaceable hydrogen, for example, a hydrogen atom on a primary or secondary amine or on a hydroxyl or carbonyl group, is to be included:

$n$, $R_2$, $R_3$, $R_3'$, $R_4$, $R_5$ and A—for the reaction of Process G are as previously defined, with the same exception as to active hydrogens as in Process F above;

Y may be aryl or lower alkyl:

$R_3$ and $R_3'$ of Process H (Step 12) are as previously defined;

R=OH, NH$_2$, O(alkali cation) lower alkoxy (e.g., methoxy) benyloxy and lower alkylbenzyloxy; (Process C, D and E).

R$_1$=mono and diloweralkyl amino, such as methyl amino, ethyl amino, dimethylamino, diethylamino and the like. (Process E).

R$_7$=NH$_2$, lower alkoxy (e.g., methoxy) a benzyloxy and lower alkyl benzyloxy (for Process A); in Process B, omit benzyloxy groups.

R$_8$=lower dialkylamino, cyclohexylamino, N - pyrrolidino, N-piperidino, N-1,2,5,6-tetrahydropyridino, N-morpholino, N-piperazino and acetyl-N-piperazino, (Process A.)

Reactions and conditions

*Step 1.*—(Process C) Reaction with NH$_2$OH or its salts (preferably 2 moles of NH$_2$OH HCl in a solvent therefor (such as H$_2$O, C$_2$H$_5$OH, glycerol, or propylene glycol—preferably t-butanol on esters and propylene glycol otherwise) at any desired temperature (reaction time varies with temperature, steam bath preferred).

*Step 2.*—(Process C) Reduction over a catalyst (such as palladium, platinum or Raney nickel—preferably 5% palladium on carbon) under moderate hydrogen pressure (preferable 40–3000 p.s.i.) in a lower alkyl alcohol (such as methanol, ethanol or propanol—preferably ethanol with a sufficient amount of HCl to maintain the reaction media acid) at any desirable temperature (room temperature preferred) until the reaction is substantially complete.

*Step 3.*—(Process E) Reaction with a lower alkyl halide (preferably 1.1 mole for a monoalkylamino and 2.5 moles for a dialkylamino) (such as methyl chloride, bromide or iodide; ethyl chloride, bromide or iodide—preferably methyl iodide) in an inert solvent (such as 1,2-dimethoxyethane, tetrahydrofuran, dimethylformamide, ether, lower alkyl alcohols, benzene, or toluene—preferably 1,2-dimethoxyethane at any desired temperature, (reaction time varies with temperature, steam bath for 3 hours preferred).

*Step 4.*—(Process D) Reaction with an amine base (preferably 1.1 mole) (such as ammonia, primary amine or secondary amine—preferably secondary amines such as morpholine, piperadine, pyrrolidine and the like) and a glyoxalic acid compound (preferably 1.1 mole) (such as glyoxalic acid, its ester, amide, substituted amide or acid salt—glyoxalic acid preferred) in water, or a mixture of water and a miscible organic solvent such as dimethylformamide, 1,2-dimethoxyethane and the like or without a solvent (use of water and 1,2-dimethoxyethane is preferred) at a temperature between 30 to 80° C. (reaction time varies with temperature—room temperature preferred).

*Step 5.*—(Process F) Reaction with a disubstituted carbodiimide (0.5 mole preferred) in a solvent (such as tetrahydrofuran (THF), 1,2-dimethoxyethane, dimethylformamide (DMF) or ethyl aceate— preferably THF) at any desired temperature (reaction time varies with temperature—room temperature for 2 hours preferred).

*Step 6.*—(Process G) Mixed or unsymmetrical anhydrides are prepared by reaction of the acid with a non-hydroxylic base, especially a nitrogenous base such as, for example, a tertiary alkyl amine, pyridine and the like to yield the corresponding acid salt, followed by treatment with an acid halide (an aryl or alkyl chloroformate, phosphorous oxychloride, thionyl chloride and the like).

*Step 7.*—(Process B) Reaction with benzoxyamine (preferably 2 moles/mole of an ester) in an inert solvent (such as lower alkyl alcohols, propylene glycol, benzene or toluene) at any desired temperature (reaction time varies with temperature, steam bath for 3 hours preferred).

*Step 8.*—(Process B) Acylation with a compound such as a mixed anhydride of benzoic acid and a strong inorganic acid or a mixed anhydride of benzoic acid and an organic acid (preferably p-methylthiobenzoyl chloride or p-chlorobenzyl chloride) in the presence of a strongly basic condensing agent such as sodium hydride and potassium hydride (sodium hydride preferred) in a suitable solvent (such as dimethylformamide, benzene and toluene dimethylformamide preferred) at any effective combination of temperature and time—preferably room temperature for 1 hour.

*Step 9.*—Same as Step 2.

*Step 10.*—Same as Step 4.

*Step 11.*—Same as Step 7.

*Step 12.*—(Process H) Pyrolysis, by heating until the lower alkene begins to evolve and maintaing the temperature of evolution until the pyrolysis is complete. It is preferred to use the t-butyl ester for pyrolysis, heating this compound under nitrogen in the presence of porous glass chips (or in the presence of a catalytic amount of strong organic or inorganic acid such as p-toluene sulfonic acid), until the isobutylene is substantially evolved.

In Step 1, (indicated in the flow sheet), hydroxylamine HCl and other acid salts are normally used, as hydroxylamine itself is not stable. However, when hydroxylamine is generated and used directly in the reaction, it may be used without being concerned with its stability.

In Step 2, the reduction may be carried out without the use of an acidic medium. However, when the reduction is carried out under acid conditions, the yield is greatly enhanced. Organic as well as inorganic acids, which are soluble in the solvent, may be used, the only restriction being, that no acid be used which is capable of being reduced.

In Step 4 (as indicated in the flow sheet) a medium having a neutral to alkaline reaction to form the amino, mono or disubstituted amino acetic acid compound is used. The reaction according to the present invention is performed at temperatures between 60 and 80° in media having a pH from 7 to 11, preferably, however, between 8 and 9 (to avoid the extensive cleavage of the acyl group). An excess of amine, for example, 2 to 3 times the equimolar amount may be used. The excess amine can serve to maintain the reaction mixture alkaline until the condensation is complete. (Only that amount of excess amine is to be used where the pH of the solution remains 9 or below). Water is used as the solvent to which, if desired, can be added for the improvement of the water solubility of the reaction components, organic solvents which are miscible in water such as methanol, ethanol, dimethylformamide 1,2 - dimethoxyethane, tetrahydrofuran, isopropanol, dioxane and the like. When the amine used has sufficient water solubility, it may also be employed as an addition solvent. The reaction can also be performed in the absence of solvents. In this case, external heating is sometimes unnecessary as at the beginning the reaction is exothermic and it can simply be left at room temperature.

Acylation will take place on the N-1 nitrogen, as indicated in Step 8, Process B of Flow Sheet II, as well as on any other substituent which contains an active hydrogen. Such substituents are an acid group, hydroxy group, amino group and the like; therefore, it is necessary (when such groups are present) to protect these groups, prior to acylation. This may be accomplished by carrying out Step 7 with the benzyl groups attached to those additional active hydrogen sites existing on the molecule. The original group containing the active hydrogen is regenerated upon the reduction of the compound, (as indicated in Step 9). The solvent used for Step 7 depends upon the type of compound to be reacted. When the compound is an ester, it is preferred to employ the alcohol corresponding to that portion of the ester molecule; in cases where the compound is other than the ester it is preferred to use propylene glycol as the solvent.

Step 12 may be carried out at temperatures between 150–250° C., however, it is preferred to use a catalyst such as an acid, glass chips or porous plate chips (preferably the latter) so that pyrolysis may be effectively caried out at lower temperatures. In cases where the indole substituents or the acyl substituents contain reducible groups, such as nitro, cyano, alkenyl and the like, Process D is followed.

Additionally, when it is desired to have a primary amino substituent on the indole ring or the aroyl radical, the starting material should contain a nitro substituent at the position in which the amino group is finally desired. When this is done, the nitro group will be reduced to the corresponding amino group, at the reduction stage (Step 2, Flow Sheet II). When it is desired to have a secondary amino group on the indole, the starting substituent should be a nitro group. The compound is then acylated, the nitro group is reduced to the amino group and the amino group is converted to the substituted amino (e.g., alkylated to produce the alkyl substituent).

The anhydride procedures (Processes F and G) are carried out on those acids which have no active replaceable hydrogen, as heretofore indicated. Thus when a primary or secondary amino group is positioned on the α-carbon, the group must first be protected before the anhydride is produced. In one preferred method, the amine is treated with an acylating agent, suitably carbobenzyloxy chloride or alternately with a sulfonating agent such as benzylsulfonyl chloride. A reaction inert solvent, suitably pyridine or a tertiary amine is used and the temperature is maintained from about −10° C., to about 40° C., preferably from 0° to 20° C., until the reaction is complete.

After the anhydride is prepared, the protecting group is removed in any suitable manner to produce the desired derivative. Hydrogenation in the presence of a catalyst is most suitable for the groups delineated above with palladium on carbon preferred when the carbobenzyloxy radical is present and Raney nickel for the benzylsulfonyl group.

Another example of a protecting group for this purpose is the reaction of benzaldehyde or a substituted benzaldehyde with a primary amine, forming a benzylidenyl radical. After the anhydride is prepared, the imine is hydrolyzed to the corresponding amine with dilute acid under mild conditions.

The procedures outlined above can be altered somewhat without departing from the spirit and scope of this invention. Each one of the procedures is not necessarily applicable to the preparation of all the compounds within the scope of the invention. Thus, for example, there may be substituted on the α-amino group or at some position on the indole nucleus a group which would interfere with reactions of a substituent at the 5-position on the nucleus. Problems such as this may be avoided by appropriate selection of the order in which reactions are performed or by the use of blocking groups in accordance with standard practice.

The following examples are used for purposes of illustration and should not be considered as limiting this invention.

EXAMPLE 1

*t-Butyl-2-methyl-5-methoxy-3-indolylglyoxylate*

To a stirred solution of 0.005 mole of oxalyl chloride in 15 ml. of anhydrous ether is added a solution of 0.005 of a mole of 2-methyl-5-methoxy-indole in 15 ml. of ether over a period of approximately 30 minutes. The mixture is then stirred several hours under a blanket of nitrogen. The mixture is concentrated to approximately ½ the volume, 4 ml. of t-butanol is added and the mixture is stirred for several hours. After removal of the ether and excess butanol, the residue is chromatographed on a 100 gm. silica gel column using ether-petroleum ether (v./v. 10–100%) as eluent to give t-butyl-2-methyl-5-methoxy-3-indolylglyoxylate.

Similarly, the above procedure is followed using methanol, ethanol, benzyl alcohol, methylamine ethylamine, propylamine, butylamine, dimethlyamine, diethylamine, methylethylamine, methylbutylamine, dibutylamine, glucosamine, glycosylamine, allylamine, phenethylamine, N-ethylphenethylamine, p-chloroaniline, 1-ethyl-2-aminomethyl piperidine, tetrahydrofurfurylamine, 1,2,5,6-tetrahydropyridine, morpholine, N-methyl piparazine, piperazine, N-phenylpiperazine, piperidine, benzylamine, aniline, p-ethoxyaniline, cyclohexylamine, pyrrolidine, N-hydroxyethylpiperazine, N,N-dimethylcarboxamidomethylamine,
N,N-diethylaminoethylamine in place of the t-butanol in the above example, there is obtained methyl-2-methyl-5-methoxy-3-indolylglyoxylate,
ethyl-2-methyl-5-methoxy-3-indolylglyoxylate,
benzyl-2-methyl-5-methoxy-3-indolyl-glyoxylate,
2-methyl-5-methoxy-3-indolylglyoxal methylamine amide,
2-methyl-5-methoxy-3-indolylglyoxal ethylamine amide,
2-methyl-5-methoxy-3-indolylglyoxal propylamine amide,
2-methyl-5-methoxy-3-indolylglyoxal butylamine amide,
2-methyl-5-methoxy-3-indolylglyoxal dimethylamine amide,
2-methyl-5-methoxy-3-indolylglyoxal diethylamine amide,
2-methyl-5-methoxy-3-indolylglyoxal methylethylamine amide,
2-methyl-5-methoxy-3-indolylglyoxal methylbutylamine amide,
2-methyl-5-methoxy-3-indolygyoxal dibutylamine amide,
2-methyl-5-methoxy-3-indolylglyoxal glucosamine amide,
2-methyl-5-methoxy-3-indolylglyoxal glycosylamine amide,
2-methyl-5-methoxy-3-indolylglyoxal glucosylamine amide,
2-methyl-5-methoxy-3-indolylglyoxal allylamine amide,
2-methyl-5-methoxy-3-indolylglyoxal phenethylamine amide,
2-methyl-5-methoxy-3-indolylglyoxal N-ethylphenethylamine amide,
2-methyl-5-methoxy-3-indolylglyoxal p-chloroaniline amide,
2-methyl-5-methoxy-3-indolylglyoxal 1-ethyl-2-aminomethyl piperidine amide.
2-methyl-5-methoxy-3-indolylglyoxal tetrahydrofurfurylamine amide,
2-methyl-5-methoxy-3-indolylglyoxal 1,2,5,6-tetrahydropyridine amide,
2-methyl-5-methoxy-3-indolylglyoxal morpholine amide
2-methyl-5-methoxy-3-indolylglyoxal N-methylpiperazine amide,
2-methyl-5-methoxy-3-indolylglyoxal piperazine amide,
2-methyl-5-methoxy-3-indolyglylyoxal N-phenyl piperazine amide,
2-methyl-5-methoxy-3-indolylglyoxal piperidine amide,
2-methyl-5-methoxy-3-indolyglyoxal benzylamine amide,
2-methyl-5-methoxy-3-indolylglyoxal anilineamide,
2-methyl-5-methoxy-3-indolylglyoxal p-ethoxyaniline amide,
2-methyl-5-methoxy-3-indolylglyoxal cyclohexylamine amide,
2-methyl-5-methoxy-3-indolylglyoxal pyrrolidineamide,
2-methyl-5-methoxy-3-indolylglyoxal N-hydroxyethylpiperazineamide,
2-methyl-5-methoxy-3-indolylglyoxal N,N-dimethylcarboxamidomethylamineamide, and
2-methyl-5-methoxy-3-indolylglyoxal N,N-diethylaminoethylamine amide, respectively.

EXAMPLE 2

The procedure of Example 1 is employed using 4-methyl-5-methyl indole,
2-methyl-5-methyl indole,
2-methyl-4-methyl-5-methyl indole,
2-methyl-4-propyl-5-propyl indole,
2-pentyl-5-methyl indole,
2-methyl-4-methoxy-5-methoxy indole, 2-methyl-4-propoxy-5-methoxy indole,
2-methyl-5-pentoxy indole,
2-methyl-4-fluoro-5-methoxy indole,
2-methyl-4-trifluoromethyl-5-methoxy indole,
2-methyl-5-nitro indole,
2-methyl-5-acetyl indole,
2-methyl-5-butyryl indole,
2-methyl-5-bis(benzyloxyethyl) amino indole,
2-methyl-5-bis(benzyloxybutyl) amino indole,
2-methyl-5-bis(benzyloxypentyl) amino indole,
2-methyl-5-(1-pyrrolidinoindole),
2-methyl-5-(4-methyl-1-piperazinyl) indole,
2-methyl-5-(4-morpholinyl) indole,
2-methyl-5-trifluoromethyl indole,
2-methyl-5-chloro indole,
2-methyl-5-bromo indole,
2-methyl-5-fluoro indole,
2-methyl-5-dimethylsulfamyl indole,
2-methyl-5-dipropylsulfamyl indole,
2-methyl-5-benzylthio indole,
2-methyl-5-p-methylbenzylthio indole,
2-methyl-5-p-propylbenzylthio indole,
2-methyl-5-p-pentylbenzylthio indole,
2-methyl-5-p-methoxybenzylthio indole,
2-methyl-5-p-propoxybenzylthio indole,
2-methyl-5-p-pentoxybenzylthio indole,
2-methyl-5-p-chlorobenzylthio indole,
2-methyl-5-p-bromobenzylthio indole,
2-methyl-5-p-fluorobenzylthio indole,
2-methyl-5-cyclopropylmethoxy indole,
2-methyl-5-ethoxy indole,
2-methyl-5-cyclobutylmethoxymethyloxy indole,
2-methyl-5-N,N-dimethylcarbamyl indole,
2-mythyl-5-dimethylamino indole,
2-methyl-5-dipropylamino indole,
2-methyl-5-dipentylamino indole,
2-methyl-5-benzyloxy indole and
2-methyl-5-diethylamino indole,
in place of methyl-5-methoxy indole.

There are obtained t-butyl-4-methyl-5-methyl-3-indolylglyoxalate,
t-butyl-2-methyl-4-methyl-3-indolylglyoxalate,
t-butyl-2-methyl-5-methyl-3-indolylglyoxalate,
t-butyl-2-methyl-4-methyl-5-methyl-3-indolylglyoxalate,
t-butyl-2-methyl-4-methyl-5-methyl-3-indolylglyoxalate,
t-butyl-2-methyl-5-propyl-3-indolylglyoxalate,
t-butyl-2-pentyl-5-methyl-3-indolylglyoxalate,
t-butyl-2-methyl-4-methoxy-5-methoxy-3-indolylglyoxate,
t-butyl-2-methyl-4-propoxy-5-methoxy-3-indolylglyoxalate,
t-butyl-2-methyl-5-pentoxy-3-indolylglyoxalate,
t-butyl-2-methyl-4-fluoro-5-methoxy-3-indolylglyoxalate,
t-butyl-2-methyl-4-trifluoromethyl-5-methoxy-3-indolylglyoxalate,
t-butyl-2-methyl-5-nitro-3-indolylglyoxalate,
t-butyl-2-methyl-5-acetyl-3-indolylglyoxalate,
t-butyl-2-methyl-5-butyryl-3-indolylglyoxalate,
t-butyl-2-methyl-5-bis(benzyloxyethyl) amino-3-indolylglyoxalate,
t-butyl-2-methyl-5-bis-(benzyloxybutyl) amino-3-indolylglyoxalate,
t-butyl-2-methyl-5-bis(benzyloxypentyl)amino-3-indolylglyoxalate,
t-butyl-2-methyl-5-(1-pyrrolidino)-3-indolylglyoxalate,
t-butyl-2-methyl-5-(4-methyl-1-piperazinyl)-3-indolylglyoxalate,
t-butyl-2-methyl-5-(4-morpholinyl)-3-indolylglyoxalate,
t-butyl-2-methyl-5-trifluoromethyl-3-indolylglyoxalate,
t-butyl-2-methyl-5-chloro-3-indolylglyoxalate,
t-butyl-2-methyl-5-bromo-3-indolylglyoxalate,
t-butly-2-methly-5-fluoro-3-indolylglyoxalate,
t-butyl-2-methyl-5-dimethylsulfamyl-3-indolylglyoxalate,
t-butyl-2-methyl-5-dipropylsulfamyl-3-indolylglyoxalate,
t-butyl-2-methyl-5-benzylthio-3-indolylglyoxalate,
t-butyl-2-methyl-5-p-methylbenzylthio-3-indolylglyoxalate,
t-butyl-2-methyl-5-p-pentylbenzylthio-3-indolylglyoxalate,
t-butyl-2-methyl-5-p-methoxybenzylthio-3-indolylglyoxalate,
t-butyl-2-methyl-5-p-propoxybenzylthio-3-indolylglyoxalate,
t-butyl-2-methyl-5-p-pentoxybenzylthio-3-indolylglyoxalate,
t-butyl-2-methyl-5-p-chlorobenzylthio-3-indolylglyoxalate,
t-butyl-2-methyl-5-p-bromobenzylthio-3-indolylglyoxalate,
t-butyl-2-methyl-5-p-fluorobenzylthio-3-indolylglyoxalate,
t-butyl-2-methyl-5-cyclopropylmethoxy-3-indolylglyoxalate,
t-butyl-2-methyl-5-cyclopropylpropoxy-3-indolylglyoxalate,
t-butyl-2-methyl-5-cyclopropylpentoxy-3-indolylglyoxalate,
t-butyl-2-methyl-5-methyloxy-3-indolylglyoxalate,
t-butyl-2-methyl-5-cyclobutylmethoxymethyloxy-3-indolylglyoxalate,
t-butyl-2-methyl-5-cyclobutylpropoxymethyloxy-3-indolylglyoxalate,
t-butyl-2-methyl-5-cyclobutylpentoxymethyloxy-3-indolylglyoxalate,
t-butyl-2-methyl-5-N,N-dimethylcarbamyl-3-indolylglyoxalate,
t-butyl-2-methyl-5-dimethylamino-3-indolylglyoxalate,
t-butyl-2-methyl-5-dipropylamino-3-indolylglyoxalate,
t-butyl-2-methyl-5-dipentylamino-3-indolylglyoxalate,
t-butyl-2-methyl-5-benzyloxy-3-indolylglyoxalate, and
t-butyl-2-methyl-5-diethylamino-3-indolylglyoxalate,
respectively.

EXAMPLE 3

Ethyl-(2-methyl-5-methoxy-3-indolyl) acetate (A) (2-methyl-5-methoxy-3-indolyl acetic acid.—A solution of 40 g. of levulinic acid in 300 ml. of hot water is added to a solution of 65 g. of p-methoxy-phenyl hydrazine hydrochloride in 700 ml. of hot water, with stirring. After one-half hour, the hydrazone derivative is collected in a filter, washed with water and dried at 110° C., in vacuo.

A solution of 120 g. of fused zinc chloride in 100 ml. of absolute ethanol has 42 g. of the above hydrazone added to it and the mixture reflexed for 18 hours. The cooled solution is poured into dilute hydrochloric acid, with stirring, and the insoluble gummy material which separates is extracted with hot ethanol. This ethanolic extract is evaporated in vacuo to a syrup, which is dissolved in ether. The ether solution is extracted several times with 10% sodium carbonate, and acidification of the latter gives (2-methyl-5-methoxy-3-indolyl) acetic acid.

Carrying out the above process with an equivalent quantity of p-nitrophenylhydrazine hydrochloride or p-ethylphenylhydrazine hydrochloride yields, respectively, (2-methyl-5-nitro-3-indolyl) acetic acid and (2-methyl-5-ethyl-3-indolyl)acetic acid.

(B) Ethyl-α-(2-methyl-5-methoxy-3-indolyl) acetate.— A total of 0.1 mole of (2-methyl-5-methoxy-3-indolyl) acetic acid is refluxed under nitrogen for six hours in 300 ml. of absolute ethanol containing 10 ml. of concentrated sulfuric acid. The ethanol is removed in vacuo, 500 ml. of ether added and the ether solution washed with water and then a saturated sodium bicarbonate solution. When the ether solution is removed in vacuo, the residue is ethyl-(2-methyl-5-methoxy-3-indolyl) acetate.

Using (2-methyl-5-nitro-3-indolyl) acetic acid (5-methoxy-3-indolyl) acetic acid and (2-methyl-3-indolyl)

acetic acid in this procedure gives the corresponding ethyl esters.

(C) When 0.3 mole of levulinic acid is mixed with 0.3 mole of 3-trifluoromethylphenylhydrazine hydrochloride acorcding to the procedure of Part A, the two isomers obtained, 2-methyl-4-trifluoromethyl-3-indolylacetic acid and 2-methyl-6-trifluoromethyl-3-indolylacetic acid, may be separated by chromatography.

When an equivalent amount of 4-methoxy-3-trifluoromethyl-phenylhydrazine hydrochloride, 4-nitro-3-trifluoromethylphenylhydrazine hydrochloride or 4-ethyl-3-trifluoromethylphenylhydrazine hydrochloride is employed in the above procedure in place of 3-trifluoromethylphenylhydrazine, both isomers of each compound are obtained, namely:

2-methyl-4-trifluoromethyl-5-methoxy-3-indolyl-acetic acid;
2-methyl-5-methoxy-6-trifluoromethyl-3-indolylacetic acid;
2-methyl-4-trifluoromethyl-5-nitro-3-indolylacetic acid;
2-methyl-5-nitro-6-trifluoromethyl-3-indolylacetic acid;
2-methyl-4-trifluoromethyl-5-ethyl-3-indolylacetic acid;
2-methyl-5-ethyl-6-trifluoromethyl-3-indolylacetic acid.

EXAMPLE 4

*Ethyl-(2-methyl-5-fluoro-3-indolyl) acetate*

A solution of 0.15 mole of p-fluorophenylhydrazine hydrochloride and 0.12 mole of ethyl levulinate in 250 ml. of 2 N ethanolic hydrochloric acid is heated on a steam bath for a few minutes. An exothermic reaction takes place with the separation of ammonium chloride. The reaction vessel is removed from the steam bath and the mixture is allowed to reflux gently until the initial reaction subsides. The mixture is again heated on a steam bath at reflux for 30 minutes, and then concentrated in vacuo to a volume of about 80 ml. The concentrate is diluted with about 400 ml. of water and extracted with ether. The ether extract is washed with a saturated solution of sodium bicarbonate, then with water, and dried to yield ethyl (2-methyl-5-fluoro-3-indolyl) acetate.

When any other ester of levulinic acid is used as a starting material in the above reaction, the corresponding ester of (2-methyl-5-fluoro-3-indolyl) acetic acid is obtained.

*Ethyl-2-phenyl-5-methoxy-3-indolyl acetate*

A three-necked flask equipped with a dropping funnel, stirring means and a nitrogen inlet tube is charged with 150 ml. of absolute ethanol and 0.145 mole sodium acetate (anhydrous), and the system flushed with nitrogen. 0.125 mole of p-methoxy-phenylhydrazine hydrochloride is added and the mixture held between 20° and 25° C. for thirty minutes. 0.142 mole of benzoylpropionic acid is added all at once, and the mixture is kept at room temperature for thirty minutes. Anhydrous hydrogen chloride (18 g.) in 125 ml. of ethanol is added over a twenty minute period, and the mixture is heated on the steam bath for two hours. After cooling, filter, remove the solvent in vacuo and take up the residue in 500 ml. of benzene, filter, wash twice with 200 ml. of 2.5 N HCl, once with 100 ml. of water, three times with 200 ml. of a saturated sodium bicarbonate solution and three times with 200 ml. of water, dry over anhydrous sodium sulfate, filter, and remove the solvent in vacuo to yield a residue of ethyl (2-phenyl-5-methoxy-3-indolyl)acetate.

When p-substituted-n-trifluoromethylphenylhydrazine hydrochloride is substituted in the above reaction in place of p-methoxyphenylhydrazine hydrochloride, the corresponding 5 - substituted - n - trifluoromethyl-2-phenyl-3-indolyl ethyl acetates are obtained.

EXAMPLE 6

*5-methoxy-3-indolyl pyruvic acid*

(A) *Ethyl-(2-ethoxalyl-5-methoxy-3-indolyl)acetate.*—To 1 mole of sodium metal in 5 moles of ethyl alcohol is added one mole of ethyl oxalate. After standing at room temperature for ten minutes, 1 mole of ethyl-(5-methoxy-3-indolyl)acetate is gradually added and the resulting mixture is allowed to stand at room temperature for five hours. The solvent is then removed in vacuo and the residue dissolved in 1.2 liters of water, adjusted to pH 2 with HCl and extracted with ether to give ethyl-(2-ethoxalyl-5-methoxy-3-indolyl)acetate.

(B) The product of Part A (50 g.) is boiled for 5 hours in a solution of 6 moles of acetic acid containing 2 g. of p-toluenesulfonic acid. The ethyl acetate which forms is removed by distillation during this period. After cooling, the solvent is evaporated in vacuo, 100 ml. of water added to residue, and the mixture stirred for one hour. Sufficient 10% sodium carbonate is added to dissolve the crystals and the solution is filtered. Acidification of the filtrate yields a precipitate of 5-methoxy-3-indolyl-pyruvic acid.

(C) By using the procedures described in this example, the following compounds are prepared:

2-methyl-5-methoxy-3-indolylpyruvic acid;
2-methyl-5-nitro-3-indolypyruvic acid;
2,5-dimethyl-3-indolylpyruvic acid;
2-phenyl-5-methoxy-3-indolylpyruvic acid;
2-methyl-3-indolylpyruvic acid;
2-benzyl-5-benzyloxy-3-indolylpyruvic acid;
2-isobutyl-5-cyclopropylmethyloxy-3-indolylpyruvic acid;
2-isopropenyl-5-t-butenyl-3-indolylpyruvic acid;
2-cyclopropyl-5-ethenyloxy-3-indolylpyruvic acid;
2-ethyl-5-trifluoromethyl-3-indolylpyruvic acid;
2,4-dimethyl-3-indolylpyruvic acid;
2,4,5-trimethyl-3-indolylpyruvic acid;
2-methyl-4,5-dipropyl-3-indolylpyruvic acid;
2-pentyl-5-methoxy-3-indolylpyruvic acid;
2-methyl-4-propoxy-5-methoxy-3-indolylpyruvic acid;
2-t-butyl-4-trifluoromethyl-5-nitro-3-indolylpyruvic acid;
2-hexyl-5-acetyl-3-indolylpyruvic acid;
2-heptyl-5-butyryl-3-indolylpyruvic acid;
2-ethyl-4-fluoro-5-benzylthio-3-indolylpyruvic acid;
2-propyl-4-methyl-5-cyclopropylmethoxy-3-indolyl-pyruvic acid;
2-isopropyl-5-ethoxy-3-indolylpyruvic acid;
2-t-butenyl-5-isopropylbenzyloxy-6-trifluoromethyl-3-indolylpyruvic acid;
2-benzyl-5,7-difluoro-3-indolylpyruvic acid;

EXAMPLE 7.—PREPARATION OF ESTERS (A) *t-Butyl-(2-methyl-5-methoxy-3-indolyl)pyruvate*

(1) *2-methyl-5-methoxy-3-indolylpyruvic acid anhydride.*—A total of 0.05 mole of N,N-dicyclohexylcarbodiimide in a minimum volume of tetrahydrofuran is added to 0.1 mole of 2-methyl-5-methoxy-3-indolylpyruvic acid in a minimum amount of the same solvent and the mixture shaken vigorously for one minute. After standing overnight at room temperature, filter and remove the solvent from the filtrate in vacuo to yield 2-methyl-5-methoxy-3-indolylpyruvic acid anhydride.

(2) *t - Butyl - (2 - methyl - 5 - methoxy - 3 - indolyl) pyruvate.*—A total of 100 ml. of t-butanol and 0.3 g. of fused zinc chloride are added to the product of Part A1 and the mixture refluxed overnight under nitrogen. After filtering, the solvent is removed in vacuo and 500 ml. of chloroform is added. The chloroform solution is washed three times with 200 ml. of water, dried over anhydrous sodium sulfate, filtered and the solvent removed in vacuo. The residue is t-butyl-(2-methyl-5-methoxy-3-indolyl)pyruvate.

(B) Methyl-(2-methyl-5-methoxy-3-indolyl)pyruvate

A solution of diazomethane in ether is added to 0.1 mole of 2-methyl-5-methoxy-3-indolylpyruvic acid until the yellow color of diazomethane persists. The solution is immediately evaporated under reduced pressure and the residue which crystallized is methyl-(2-methyl-5-methoxy-3-indolyl)pyruvate.

(C) Benzyl-(2-methyl-5-methoxy-3-indolyl)pyruvate

A mixture of 0.1 mole of sodium benzylate in 0.1 liter of dioxane, under nitrogen, is gradually added, with stirring, to 1.2–1.5 liters of dioxane, at 0°–5° C. containing 0.1 mole of the product of Part A1. The mixture is stirred at 20°–25° C. for two hours and then acidified with hydrochloric acid to pH 3 to precipitate benzyl-(2-methyl-5-methoxy-3-indolyl)pyruvate.

When the sodium salts of other alcoholates are used in place of sodium benzylate in this reaction, other esters are similarly prepared, for examples: ethyl-(2-methyl-5-methoxy-3-indolyl) pyruvate; isobutyl-(2-methyl-5-methoxy-3-indolyl) pyruvate.

(D) Using the procedures of this example, the indolylpyruvic acids of Example 6C yields the corresponding esters.

EXAMPLE 8

(A) *t - Butyl - (2-methyl-5-dimethylamino-3-indolyl)-pyruvate.*—A total of 0.01 mole of t-butyl-2-methyl-5-nitro-3-indolylpyruvate, 150 ml. of t-butanol, 15 ml. of glacial acetic acid and 5 ml. of 37% aqueous formaldehyde are reduced in a 40 p.s.i. hydrogen atmosphere at room temperature in the presence of about 4 g. of Raney nickel catalyst. After filtering, the filtrate is concentrated in vacuo to about 25 ml., 250 ml. of ether is added, and the ether solution is washed twice with 100 ml. saturated sodium bicarbonate solution, twice with 100 ml. water and then extracted three times with 100 ml. 2.5 N hydrochloric acid. The combined aqueous extracts are made slightly alkaline with concentrated ammonium hydroxide and extracted three times with 100 ml. chloroform. The chloroform extracts are combined, washed twice with 100 ml. water, dried over anhydrous potassium carbonate, filtered, and the solvent removed in vacuo to yield t-butyl-2-methyl-5-dimethylamino-3-indolylpyruvate.

Utilizing the procedure described above, the following compounds are prepared:

t-butyl-(2-phenyl-5-dimethylamino-3-indolyl)pyruvate;
methyl-(2-methyl-5-dimethylamino-3-indolyl)pyruvate.

(B) *t - Butyl-(2-methyl-5-amino-3-indolyl)pyruvate.*—t-Butyl-(2-methyl-5-nitro-3-indolyl)pyruvate (0.02 mole) in 100 ml. of t-butanol is hydrogenated at 25° C. and atmospheric pressure in the presence of 1 g. of a 10% palladium on-charcoal catalyst. After completion of the hydrogenation, the catalyst is filtered off and the solvent evaporated in vacuo to give t-butyl-(2-methyl-5-amino-3-indolyl) pyruvate.

EXAMPLE 9

(A) *t - Butyl - β-(2-methyl-5-methoxy-3-indolyl)-α-(O-benzyloximino) propionate.*—A mixture of 0.01 mole of t-butyl-(2-methyl-5-methoxy-3-indolyl)pyruvate, benzyloxyamine (0.02 mole), 5 ml. of pyridine and 20 ml. of t-butanol is heated on the steam bath under nitrogen for 3 hours. The mixture is concentrated in vacuo to about 10 ml. and poured into 250 ml. of a stirred ice-water mixture. After the ice melted the organic material is collected, washed with water and dried, to yield t-butyl-β-(2-methyl-5-methoxy-3-indolyl)-α-(o-benzyloximino) propionate.

(B) Similarly, using esters of Example 7 in the above procedure, the following compounds are prepared:

t-butyl - β - (2 - methyl-5-dimethylamino-3-indolyl)-α-(o-benzyloximino) propionate;

methyl - β - (2 - phenyl - 5-trifluoromethyl-3-indolyl-α-(o-benzyloximino) propionate.

EXAMPLE 10

*t-Butyl-[1-(p-chlorobenzoyl)-2-methyl-5-methoxy-3-indolyl] glyoxalate*

A solution of (0.021 mole) of t-butyl-α-(2-methyl-5-methoxy-3-indolyl) glyoxalate in 20 ml. of dimethylformamide is added dropwise to a cold suspension of 1.0 g. (0.022 mole) of sodium hydride (52% dispersion in mineral oil) and 25 ml. of dimethylformamide. The mixture is stirred at room temperature for 20 minutes, cooled and treated with 0.0222 mole of p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether layer is dried and concentrated at reduced pressure to give t-butyl-α-[1-(p-chlorobenzoyl)-2-methyl-5-methoxy-3-indolyl] glyoxalate.

Similarly, when using 3,4,5-trimethoxybenzoyl chloride,
p-trifluoroactylbenzoyl chloride,
p-N,N-dimethylsulfamylbenzoyl chloride,
p-difluoroacetylbenzoic acid,
p-monofluoroacetylbenzoic acid,
p-carbomethoxybenzoyl chloride,
p-formylbenzoyl chloride,
p-trifluoromethylthiobenzoyl chloride,
N,N-dimethyl-p-sulfonamidobenzoyl chloride,
p-methylsulfinylbenzoyl chloride,
p-methylsulfonylbenzoyl chloride,
p-benzylthiobenzoyl chloride,
p-4'-methylbenzylthiobenzoic acid,
p-4-methoxybenzylthiobenzoic acid,
p-4'-chlorobenzylthiobenzoic acid,
p-mercaptobenzoyl chloride,
p-dimethylaminobenzoyl chloride,
p-acetaminobenzoyl chloride,
o-o-fluoro-p-chlorobenzoyl chloride,
o-methoxy-p-chlorofluoro-p-chlorobenzoyl chloride,
o-methoxy-p-chlorobenzoyl chloride,
2,4,5-trichlorobenzoyl chloride in place of p-chlorobenzoyl chloride, there are obtained t-butyl-1-3,4,5-trimethoxybenzoyl-2-methyl-5-methoxy-3-indolylglyoxalate,
t-butyl-1-p-trifluoroacetylbenzoyl-2-methyl-5-methoxy-3-indolylglyoxalate,
t-butyl-1-p-N,N-dimethylsulfamylbenzoyl-2-methyl-5-methoxy-3-indolylglyoxalate,
t-butyl-1-p-difluoroacetylbenzyl-2-methyl-5-methoxy-3-indolylglyoxalate,
t - butyl-1-p-monofluoroacetylbenzyl-2-methyl-5-methoxy-3-indolylglyoxalate,
t-butyl-1-p-carbomethoxybenzyl-2-methyl-5-methoxy-3-indolylglyoxalate,
t-butyl-1-p-formylbenzoyl-2-methyl-5-methoxy-3-indolylglyoxalate,
t-butyl-1-p-trifluoromethylthiobenzoyl-2-methyl-5-methoxy-3-indolylglyoxalate,
t - butyl-1-N,N-dimethyl-p-sulfonamidobenzoyl-2-methyl-5-methoxy-3-indolylglyoxalate,
t-butyl-1-p-methylsulfinylbenzoyl-2-methyl-5-methoxy-3-indolylglyoxalate,
t-butyl-1-p-methylsulfonylbenzoyl-2-methyl-5-methoxy-3-indolylglyoxalate,
t-butyl-1-p-benzylthiobenzoyl-2-methyl-5-methoxy-3-indolylglyoxalate,
t-butyl-1-p-4'-methylbenzylthiobenzoyl-2-methyl-5-methoxy-3-indolylglyoxalate,
t-butyl-1-p-4'-methoxybenzylthiobenzyl-2-methyl-5-methoxy-3-indolylglyoxalate, -butyl-1-chlorobenzylthiobenzyl)-2-methyl-5-methoxy-3-indolylglyoxalate,
-butyl-1-p-mercaptobenzoyl-2-methyl-5-methoxy-3-indolylglyoxalate,
-butyl-1-p-dimethylaminobenzoyl-2-methyl-5-methoxy-3-indolylglyoxalate,
-butyl-1-p-acetaminobenzoyl-2-methyl-5-methoxy-3-indolylglyoxalate,
t - butyl - 1-o-fluoro-p-chlorobenzoyl-2-methyl-5-methoxy-3-indolylglyoxalate,
t-butyl-1-o-methoxy-p-chlorobenzoyl-2-methyl-5- methoxy-3-indolylglyoxalate, and
t-butyl-1-2,4,5-trichlorobenzoyl-2-methyl-5-methoxy-3-indolylglyoxalate, respectively.

Also, by using the following aroyl compounds in this procedure, the corresponding 1-aroyl-3-idolyl-glyoxalates are obtained:

p-methylthiobenzoyl chloride;
3-furoyl chloride;
5-fluoro-2-thenoyl chloride;
3-thenoyl chloride;
5-nitro-2-furoyl chloride;
p-acetylbenzoyl chloride;
N,N-dimethyl-p-carboxamidobenzoyl chloride.

EXAMPLE 11

The procedure of Example 10 is employed using the t-butyl substituted-3-indolylgyloxalates of Example 2 in place of t-butyl-2-methyl-5-methoxy-3-indolylglyoxalate. There are obtained the corresponding t-butyl-1-(p-chlorobenzoyl)-substituted-3-indolylglyoxalates.

Similarly, the procedure of Example 10 is employed using the 2-methyl-5-methoxy-3-indolylglyoxolate substituted amides obtained from Example 1 in place of t-butyl-2-methyl-5-methoxy-3-indolylglyoxalate. There are obtained the corresponding 1-p-chlorobenzoyl-2-methyl-5-methoxy-3-indolylglyoxol substituted amides. And by using that procedure on the indolyl-$\alpha$-(O-benzyl-oximino) propionate esters obtained in Example 9, there are obtained:

t-butyl-$\beta$-[1 - (p-carbomethoxybenzoyl) - 2 - methyl - 5-methoxy-3-indolyl]-$\alpha$-(O-benzyloximino) propionate;
methyl-$\beta$-[1-(N,N-dimethyl - p - sulfonamidobenzoyl)-2-benzyl-5-cyclopropyl-3-indolyl]-$\alpha$-(O - benzyloximino) propionate;
t - butyl-$\beta$-[1-p-methylthiobenzoyl)-2-methyl-5-dimethylamino-3-indolyl]-$\alpha$-(O-benzyloximino) propionate.

EXAMPLE 12

*t-Butyl-$\beta$-[1-(p-chlorobenzoyl)-2-methyl-5-(1-pyrrolidino)-3-indolyl]-$\alpha$-(O-benzyloximino) propionate*

Add 1.5 g. of t-butyl-$\beta$-[1-p-cholorbenzoyl-2-methyl-5-amino-3-indolyl]-$\alpha$-(O-benzyloximino)-propionate 1 g. of 1,4-dibromobutane and 0.975 g. of anhydrous sodium carbonate to 80 ml. of ethanol and stir at reflux in a nitrogen atmosphere for six hours. The reaction mixture is then filtered and the filtrate concentrated in vacuo to a small volume and diluted with ether. The solution is washed twice with water, dried in anhydrous sodium sulfate and concentrated in vacuo to dryness, to produce t-butyl-$\beta$-[1-(p - chlorobenzoyl) - 2 - methyl - 5 - (1 - pyrrolidino)-3-indolyl]-$\alpha$-(O-benzyloximino) propionate.

When ethylene dibromide is used instead of dibromobutane, the product obtained is the 5-(-1-azacyclopropyl) indolyl propionate componud.

EXAMPLE 13

(A) *t - Butyl - $\beta$ - [1 - (p-chlorobenzoyl) - 2 - methyl-5 - bis($\beta$ - hydroxyethyl) amino - 3 - indolyl] - $\alpha$ - (O-benzyloximino) propionate.*—A mixture of 0.02 mole of t - butyl - $\beta$ - [1 - (p - chlorobenzoyl) - 2 - methyl - 5-amino - 3 - indolyl] - $\alpha$ - (O - benzyloximino) propionate, 0.44 mole of ethylene oxide and 0.03 moles of acetic acid in 300 ml. dimethoxyethane is heated to 100° C. for 18 hours in an autoclave. The mixture is then diluted with water and filtered to yield t-butyl-$\beta$-[1-(p-chlorobenzoyl)-2 - methyl - 5 - bis($\beta$ - hydroxyethyl)amino - 3 - indolyl]-$\alpha$-(O-benzyloximino) propionate.

When an equivalent amount of propylene oxide is used in the above procedure in place of ethylene oxide, there is obtained t - butyl - $\beta$ - [1 - (p - chlorobenzoyl)-2 - methyl - 5 - bis($\beta$ - hydroxypropyl)amino - 3 - indolyl]-$\alpha$-(O-benzyloximino) propionate.

(B) *t - Butyl - $\beta$ - [1 - (p - chlorobenzoyl)-2-methyl-5-(4'methyl - 1' - piperazinyl) - 3 - indolyl] - $\alpha$ - (O-benzyloximino) propionate.*—The product of Part A is stirred with two mole proportions of p-toluenesulfonyl chloride in pyridine until the reaction is substantially complete. The mixture is poured into water and the 5-bis (p-toluenesulfonyl-oxyethyl) amino compound is isolated, dissolved in benzene and 1 mole of methylamine added. The mixture is allowed to stand at room temperature for three days, then poured into iced water containing two equivalents of sodium carbonate and extracted with ether immediately. Evaporation of the ether yields t-butyl-$\beta$-[1 - (p - chlorobenzoyl) - 2 - methyl - 5 - (4' - methyl - 1'-piperazinyl)-3-indolyl]$\alpha$-(O - benzyloximino) propionate.

EXAMPLE 14

*t-Butyl-$\beta$-[1-(p-chlorobenzoyl)-3-methyl-5-(4'-morpholinyl)3-indolyl]-$\alpha$-(O-benzyloximino) propionate*

A solution of tosyl chloride (0.1 mole) in 200 ml. benzene is added dropwise, with stirring, to a solution of t-butyl - $\beta$ - [1 - (p - chlorobenzoyl) - 2 - methyl - 5 - bis($\beta$-hydroxyethyl) amino-3-indolyl]-$\alpha$-(O - benzyloximino) propionate (0.1 mole) and pyridine (0.3 mole) in 300 ml. benzene over a period of one hour, at room temperature. The mixture is then heated under reflux for three hours, washed with water, dried over sodium sulfate and evaporated to yield t-butyl $\beta$-[1-(p-chlorobenzoyl)-2-methyl-5 - ( 4' - morpholinyl) - 3 - indolyl - $\alpha$ - (O - benzyloximino) propionate.

EXAMPLE 15

*t-Butyl [1-(p-chlorobenzoyl)-2-methyl-5-methoxy-3-indolyl]-$\alpha$-aminoacetate*

A mixture of 0.01 mole of t-butyl 1-(p-chlorobenzoyl)-2-methyl-5-methoxy-3-indolylglyoxalate, 0.02 mole of hydroxylamine hydrochloride, 20 ml. of t-butanol and 5 ml. of pyridine is heated on the stream bath under nitrogen for 3 hours. The mixture is concentrated in vacuo to ca. 10 ml. and poured into ca. 250 ml. of a stirred ice-water mixture. After the ice has melted, the organic material is collected, washed well with water until the odor of pyridine is removed, dried, dissolved in 25 ml. of ethanol and 0.02 mole of 38% hydrochloric acid. The mixture is then reduced in a 3000 p.s.i. hydrogen atmosphere at room temperature in the presence of 1 gram of 5% palladium on carbon. This mixture is filtered and 50 ml. of 2.5 N hydrochloric acid is added. The solution is washed with 2×50 ml. chloroform, cooled, made slightly alkaline with concentrated ammonium hydroxide, and extracted with 3×50 ml. chloroform. The chloroform extracts are combined, washed with 2×100 ml. water, dried over anhydrous potassium carbonate, filtered, and concentrated in vacuo to a syrup (which is chromatographed on a silica gel column using ether-ethylacetate as eluent) to give t-butyl 1-(p-chlorobenzoyl)-2-methyl-5-methoxy-3-indolyl-$\alpha$-aminoacetate.

Similarly, using the methyl or ethyl glyoxylate with the corresponding alcohol solvent in the above procedure gives methyl and ethyl 1-p-chlorobenzoyl-2-methyl-5-methoxy-3-indolyl-$\alpha$-aminoacetate, respectively.

EXAMPLE 16

The procedure of Example 15 is employed using the t - butyl - 1 - aroyl - substituted - 3 - indolylglyoxalates obtained from Examples 10 and 11 in place of t-butyl-1 - p - chlorobenzoyl - 2 - methyl - 5 - methoxy - 3- indolylglyoxalate. There are obtained in the corresponding t-butyl-1-aroyl-substituted-3-indolyl-α-aminoacetates.

Similarly, the procedure of Example 15 is employed using the 1 - p - chlorobenzoyl - 2-methyl-5-methoxy-3-indolylglyoxol-substituted amides obtained from Example 11 in place of t - butyl - 1 - p - chlorobenzoyl-2-methyl-5-methoxy-3-indolylglyoxalate. There are obtained the corresponding 1 - p - chlorobenzoyl-2-methyl-5-methoxy-3-indolyl-α-amino-substituted amides.

EXAMPLE 17

*t-Butyl α-[1-(p-chlorobenzoyl)-2-methyl-5-methoxy-3-indolyl]-α-methylaminoacetate*

A mixture of 0.01 mole of t-butyl α-[1-(p-chlorobenzoyl) - 2 - methyl - 5-methoxy - 3 - indolyl] - α-amino-acetate, 0.011 mole of methyl iodide and 0.015 mole of sodium bicarbonate in 50 ml. anhydrous 1,2-dimethoxy-ethane are heated on the steam bath under nitrogen for three hours. The solution is filtered, the solvent is removed in vacuo, and the residue chromatographed on a 150 g. neutral alumina column using ether-petroleum ether (v./v. 20–100%) as eluent to give t-butyl - α - [1 - (p - chlorobenzoyl) - 2 - methyl - 5-methoxy-3-indolyl]-α-methylaminoacetate.

Similarly, using the corresponding methyl or ethyl ester in the above procedure gives methyl and ethyl α-[1-(p-chlorobenzoyl) - 2 - methyl - 5 - methoxy - 3 - indolyl]-α-methylaminoacetate, respectively.

EXAMPLE 18

The procedure of Example 17 is employed using the t - butyl - 1 - aroyl - substituted - 3 - indolyl - α - amino-acetates obtained from Example 16 in place of t-butyl-1-p - chlorobenzoyl - 2 - methyl - 5 - methoxy - 3 - indolyl-α-amino-acetate. There are obtained the t-butyl-1-aroyl-substituted-3-indolyl-α-methylaminoacetates.

Similarly, the procedure of Example 17 is employed using the 1 - p - chlorobenzoyl - 2 - methyl - 5-methoxy-3-indolyl-2-amino-substituted amides obtained from Example 16 in place of t-butyl-1-p-chlorobenzoyl-2-methyl-5-methoxy-3-indolyl-α-aminoacetate. There are obtained the corresponding 1 - p - chlorobenzoyl - 2 - methyl - 5-methoxy-3-indolyl-α-methylamino-substituted amides.

EXAMPLE 19

(A) *t - Butyl α - [1 - (p - chlorobenzoyl)-2-methyl-5-methoxy-3-indolyl]-α-dimethylaminoacetate.*—A mixture of 0.01 mole of t-butyl α-[1-(p-chlorobenzoyl)-2-methyl-5-methoxy-3-indolyl]-α-aminoacetate, 0.022 mole methyl iodide and 0.03 mole sodium bicarbonate in 50 ml. anhydrous 1,2-dimethoxyethane is heated on the steam bath under nitrogen, for five hours. After filtering, the solvent is removed in vacuo and the residue chromatographed on a 200 g. alumina column using ether-petroleum ether (v./v. 20–100%) as eluent to give t-butyl α-[1-(p-chlorobenzoyl) - 2 - methyl - 5 - methoxy - 3 - indolyl]-α-dimethylaminoacetate.

(B) Similarly, using the corresponding methyl and ethyl ester in the above procedure gives methyl and ethyl α-[1-(p - chlorobenzoyl) - 2 - methyl - 5 - methoxy - 3 - indolyl] α-dimethylaminoacetate, respectively.

EXAMPLE 20

The procedure of Example 19 is followed using the t - butyl - 1 - aroyl - substituted - 3 - indolyl - α - amino-acetates obtained from Example 16, in place of t-butyl-1-p - chlorobenzoyl - 2 - methyl - 5 - methoxy - 3 - indolyl-α-aminoacetate. There are obtained the t-butyl-1-aroyl-substituted-3-indolyl-α-dimethylaminoacetates.

Similarly, the procedure of Example 19 is followed using the 1 - (p - chlorobenzoyl)-2-methyl-5-methoxy-3-indolyl-α-amino-ethyl-substituted amides obtained from Example 16 in place of t-butyl-1-(p-chlorobenzoyl)-2-methyl-5-methoxy-3-indolyl-α-aminoacetate. There are obtained the corresponding 1-(p-chlorobenzoyl)-2-methyl-5-methoxy-3-indolyl-α-dimethylamino-substituted amides.

EXAMPLE 21

(A) *t - Butyl α - [1 - (p - chlorobenzoyl)-2-methyl-5-amino - 3 - indolyl]-α-aminoacetate.*—The procedure of Example 15 is employed using t-butyl 1-(p-chlorobenzoyl)-2-methyl-5-nitro-3-indolylglyoxalate in place of t - butyl 1 - (p - chlorobenzoyl - 2 - methyl - 5 - methoxy-3-indolylglyoxalate, to obtain the 5-nitro-oximino ester. The crude oxime is then placed in a solution of ca. 30 ml. of ethanol and 0.04 mole of 38% hydrochloric acid, and the mixture reduced under a 40 p.s.i. hydrogen atmosphere at room temperature in the presence of ca. 5% palladium on charcoal. The mixture is then filtered and 50 ml. of 2.5 N hydrochloric acid is added. The aqueous phase is washed with 2×50 ml. chloroform, cooled, made slightly alkaline with concentrated ammonium hydroxide and extracted with 3×50 ml. chloroform. The chloroform extracts are combined, washed with 2×100 ml. water, dried over anhydrous potassium carbonate, filtered, the solvent removed in vacuo and the residue chromatographed on a 200 g. alumina column using as ethyl acetate-ether (v./v. 0–100%) solvent system to give t-butyl [1 - (p - chlorobenzoyl) - 2 - methyl - 5 - amino - 3-indolyl]-α-aminoacetate.

Similarly using t-butyl-1-(p-chlorobenzoyl)-2-methyl-5-nitromethyl - 3 - indolylglyoxalate, t - butyl - 1 - (p-chlorobenzoyl) - 2 - methyl - 5 - (1 - nitrobutyl) - 3-indolylglyoxalate and t - butyl - 1-(p-chlorobenzoyl)-2-methyl - 5 - (1 - nitropentyl) - 3-indolylglyoxalate in place of t - butyl - 1 - (p - chlorobenzoyl) - 2 - methyl - 5 - nitro-3-indolylglyoxalate, there are obtained t-butyl-1-(p-chlorobenzoyl) - 2 - methyl - 5 - aminomethyl - 3 - indolyl - α-aminoacetate, t - butyl - 1 - p(chlorobenzoyl) - 2 - methyl-5 - (1 - aminobutyl) - 3 - indolyl - α - aminoacetate and t - butyl - 1 - (p - chlorobenzoyl) - 2 - methyl - 5 - (1-aminopentyl)-3-indolyl-α-aminoacetate, respectively.

(B) *t - Butyl - β - [1-(p - chlorobenzoyl) - 2 - methyl-5 - methoxy - 3 - indolyl] - α - aminopropionate.*—t-Butyl β - [1 - (p - chlorobenzoyl) - 2 - methyl - 5 - methoxy - 3-indolyl] - α - (O-benzyloximino)-propionate (0.01 mole) of ethanol with 0.02 mole of 38% hydrochloric acid is reduced under a 40 p.s.i. atmosphere of hydrogen at room temperature in the presence of about 0.5 g. of Raney-nickel. The mixture is then filtered, the residue washed with 50 ml. of 2.5 N hydrochloric acid and the combined filtrate and washings are washed twice with 50 ml. of chloroform. The aqueous layer is then cooled to 10° C., made slightly alkaline with concentrated ammonium hydroxide and extracted three times with 50 ml. of chloroform. The combined chloroform extracts are washed twice with 100 ml. of water, dried over anhydrous potassium carbonate, filtered, and the chloroform removed in vacuo to yield t-butyl-β-[1-(p-chlorobenzoyl)-2-methyl-5-methoxy-3-indolyl]-α-aminopropionate.

Utilizing the process of this example, the following compounds are prepared:

methyl - β - [1(p - N,N - dimethylsulfamylbenzoyl) - 2-ethyl - 5 - cyclopropylemethyloxy - 3 - indolyl] - α - aminopropionate;

isopropyl - β - [1-(2,4,5, - trichlorobenzoyl) - 2 - pentyl - 5 - amino - 3 - indolyl] - α - aminopropionate;

ethyl - β - [1 - (3 - furoyl) - 2 - benzyl - 5 - ethoxy - 3 - indolyl] - α - aminopropionate;

benzyl - β - [1 - (3,4,5 - trimethoxybenzoyl) - 2(2,33-trimethyl - pentyl - 5 - benzyloxy - 3 - indolyl] - aminopropionate.

EXAMPLE 22

The procedure of Example 17 is followed using the β-(1 - acylated - 3 - indolyl) - α - aminopropionates of Example 21 in place of the t-butyl ester of the former to obtain the corresponding β - (1 - acylated - 3 - indolyl) - α-methylaminopropionates.

Similarly, using the same α-aminopropionic esters of Example 21 in the Example 19 procedure yields the corresponding α-(disubstituted amino)propionate for example:

benzyl - β - [1 - (p - acetylbenzoyl) - 2 - heptyl - 5 - bis (β - hydroxy - ethyl)amino - 3 - indolyl] - α - dimethylaminopropionate;

t-butyl - β - [1 - (p - phenoxybenzoyl) - 2 - (t - butyl) - 5 - (1' - pyrrolidino) - 3 - indolyl] - α - dimethylaminopropionate.

EXAMPLE 23

*t-Butyl-α-[1-(p-chlorobenzoyl)-2-methyl-5-dimethylamino-3-indolyl]-α-dimethylaminoacetate*

A mixture of 0.01 mole of t-butyl α-[1-(p-chlorobenzoyl) - 2 - methyl - 5 - amino - 3 - indolyl] - α - aminoacetate, 0.044 mole of methyl iodide and 0.06 mole of sodium bicarbonate in 75 ml. of anhydrous 1,2-dimethoxyethane is heated on the steam bath under nitrogen for 6 hours. The solution is filtered and the solvent is removed in vacuo. The residue is chromatographed on a 250 g. alumina column using an ethylacetate - ether (v./v. 0–100%) system as eluent to give t-butyl-α-[1- (p - chlorobenzoyl) - 2 - methyl - 5 - dimethyl - amino - 3 - indolyl] - α - dimethylaminoacetate.

The comparable propionate ester is similarly treated to yield t-butyl β - [1 - (p - chlorobenzoyl) - 2 - methyl - 5 - dimethylamino - 3 - indolyl] - α - dimethylaminopropionate.

EXAMPLE 24

*t-Butyl - α - [1 - p - chlorobenzoyl) - 2 - methyl - 5 - methylamino - 3 indolyl] - α - methylaminoacetate*

A mixture of 0.01 mole of t-butyl - α - [1 - (p - chlorobenzoyl) - 2 - methyl - 5 - amino - 3 - indolyl] - α- aminoacetate, .022 mole of methyl iodide and 0.06 mole of sodium bicarbonate in 75 ml. of anhydrous 1,2-dimethoxyethane is heated on the steam bath under nitrogen for 6 hours. The solution is filtered and the solvent is removed in vacuo. The residue is chromatographed on a 250 g. alumina column using an ethylacetate-ether (v./v. 0–100%) system as eluent to give t-butyl - α - [1- (p - chlorobenzoyl) - 2 - methyl - 5 - methylamino - 3 - indolyl]-α-methylaminoacetate.

Similarly, when using propyl iodide and pentyl-iodide in place of methyl iodide, or the propionates in place of the acetate there are obtained the corresponding indole -α - propylaminoacetate and indole - α - pentylaminoacetate, or the corresponding propionates, respectively.

EXAMPLE 25

*1-(p-chlorobenzoyl)-2-methyl-5-methoxy-indole*

To a solution of 0.21 mole of 2-methyl-5-methoxyindole in 2 ml. of dimethylformamide is added dropwise a cold suspension of 0.22 mole of sodium hydride (52% dispersion in mineral oil) and 25 ml. of dimethylformamide. The mixture is stirred at room temperature for 20 minutes, cooled and treated with .022 mole of p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and 3 100 ml. portions of water. The ether layer is dried, concentrated at reduced pressure and chromatographed on 800 gm. of acid-washed alumina using ether-petroleum ether (v./v. 0–20%) as eluent to give 1 - (p - chlorobenzoyl) - 2 - methyl - 5 - methoxy indole.

Similarly, when using the substituted and unsubstituted aroyl compounds (acid and acid chlorides) of Example 10 in place of 1-p-chlorobenzoyl chloride, there are obtained the corresponding 1-aroyl-2-methyl-5-methoxy indoles.

Similarly, when using the substituted and unsubstituted aroyl compounds (acid and acid chlorides) of Example 2 in place of 2-methyl-5-methoxy indole, there are obtained the corresponding 1-(p-chlorobenzoyl)-substituted indoles.

Similarly, when using 2-methyl-5-benzyloxy-indole, 2 - methyl - 5 - p - methylbenzyloxy indole, 2 - methyl - 5 - p - pentylbenzyloxy - indole - 2 - methyl - 5 - p-pentylbenzyloxy - indole - 2 - methyl - 5 - p - methoxybenzyloxy indole, 2 - methyl - 5 - p - propoxybenzyloxy indole, 2-methyl - 5 - p - pentoxybenzyloxy indole, 2 - methyl - 5 - p - fluorobenzyloxy indole in place of 2-methyl-5-methoxy indole, there are obtained the corresponding 1-(p-chlorobenzoyl)-substituted indoles.

EXAMPLE 26

The procedure of Example 25 is employed, using p-phenoxybenzoylchloride, p-4'-tolyloxybenzoic acid, p-4'-methoxyphenoxybenzoic acid, p-4'-chlorophenoxybenzoic acid, p-cyanobenzoyl chloride, p-nitrobenzoyl chloride, and o-hydroxychlorobenzoyl chloride in place of p-chlorobenzoyl chloride. There are obtained 1-(p-phenoxybenzoyl)-2-methyl - 5 - methoxy indole, 1-(p-4'-tolyloxybenzoyl)-2-methyl - 5 - methoxy indole, 1(p-4'-methoxyphenoxybenzoyl)-2-methyl - 5 - methoxy indole, 1 - (p-4'-chlorophenoxybenzoyl) - 2 - methyl-5-methoxy indole, 1 - (p-4'-chlorophenoxybenzoyl) - 2 - methyl-5-methoxy indole, 1-(p-cyanobenzoyl)-2-methyl-5-methoxy indole, 1-(p-nitrobenzoyl)-2-methyl-5-methoxy indole and 1 - (o-hydroxy-p-chlorobenzoyl)-2-methyl-5-methoxy indole, respectively.

Similarly, when using 2-(eth-1-en)-5-(eth-1-en) indole, 2-(prop-1-en)-5-(prop-1-en) indole, 2-(pent - 1 - en)-5-(pent-1-en) indole, 2-(1-ethenoxy) - 5 - (1-ethenoxy) indole, 2-(1-propenoxy)-5-(1-propenoxy) indole, 2-(1-pentenoxy)-5-(1-pentenoxy) indole, and 2-methyl-5-azacyclopropyl indole in place of 2-methyl-5-methoxy indole, there are obtained the corresponding 1-(p-chlorobenzoyl)-substituted indoles.

EXAMPLE 27

*α-N,N-dimethylamino-1-(p-chlorobenzoyl)-2-methyl-5-methoxy indole-3-acetic acid ethyl ester*

To a solution of .11 mole of glyoxylic acid ethyl ester is added .11 mole of dimethylamine at 0–4° C. in 30 parts by volume of dimethylformamide, and on completion of the addition, the entire mixture is stirred for one hour at room temperature. To this mixture is added .10 mole of 1-(p-chlorobenzoyl)-2-methyl-5-methoxy indole in small portions at a temperature between 0 and 4° C. After the reaction mixture has obtained room temperature, it is stirred for 2 hours at room temperature and finally heated for 3–7 hours at 30–80° C. The dimethylformamide is distilled off in vacuo under a nitrogen atmosphere and the residue dissolved in ether. The ethereal solution is extracted at 0° with 2 N hydrochloric acid or with 2 N tartaric acid and the extracts are made alkaline, while remaining cool, with 2 N sodium hydroxide. The oily base which separates is extracted with ether, washed with water and dried over sodium sulfate. After distilling off the solvent, the residue is crystallized with ether-petroleum ether, ether cyclohexane to obtain α-N,N-dimethylamino-1-(p-chlorobenzoyl) - 2 - methyl-5-methoxy indole-3-acetic acid ethyl ester.

Similarly, when using the 1-aroyl-substituted indoles obtained from Examples 25 and 26, in place of 1-(p-chlorobenzoyl)-2-methyl-5-methoxy indole, there are obtained the corresponding α-N,N-dimethylamino-1-aroyl-substituted-indole-3-acetic acid ethyl ester.

Similarly, when using ammonia water, methylamine, propylamine, pentylamine, dipropylamine, dipentylamine, benzylamine, p-methylbenzylamine, p-butylbenzylamine, cyclohexylamine, pyrrolidine, piperadine, 1,2,5,6-tetrahydropyridine, morpholine, piperazine, acetyl-piperazine, beta-dipropyl-amino-ethylamine and diethanolamine in place of dimethylamine, there are obtained the corresponding α-substituted and unsubstituted amino-1-(p- chlorobenzoyl)-2-methyl-5-methoxy indole-3-acetic acid ethyl esters.

Similarly, there is used glyoxylic acid, glyoxylic amide (and substituted amides), sodium glyoxalate, benzyl glyoxalate and 1-methylbenzyl glyoxalate in place of glyoxylic acid ethyl ester. There are obtained the corresponding α-N,N-dimethylamino - p - chlorobenzoyl-2-methyl-5-methoxy-indole acid compounds.

EXAMPLE 28 t-Butyl-α-(2-methyl-5-methoxy-3-indolyl)-α-(o-benzyloximino)acetate

The procedure of Example 9 is employed using t-butyl-2-methyl-5-methoxy-3-indolylglyoxalate in place of the pyruvate compound to produce t-butyl-α-(2-methyl-5-methoxy-3-indolyl-α-(o-benzyloximino) acetate.

Similarly, when using the t-butyl-3-indolyl glyoxylate esters from Example 2 in place of t-butyl-2-methyl-5-methoxy-3-indolylglyoxalate, there are obtained the corresponding t-butyl-α-(substituted-3-indolyl)-α-(o-benzyloximino) acetates.

And, the above procedure is also followed using the 2-methyl-5-methoxy-3-indolylglyoxal - substituted amides obtained from Example 1, in place of t-butyl-2-methyl-5-methoxy-3-indolylglyoxalate. There are obtained the corresponding 2-methyl-5-methoxy-3-indolyl-α-(o-benzyloximino)-substituted amides.

EXAMPLE 29 t-Butyl-α-(1-nicotinoyl-2-methyl-5-methoxy-3-indolyl)-α-(o-benzyloximino) acetate (A) *p-Nitrophenyl nicotinate.*—To a solution of 0.01 mole of nicotinic acid and 0.01 mole p-nitrophenol in a minimum amount of anhydrous tetrahydrofuran is added 0.01 mole of N,N'-dicyclohexylcarbodiimide in a minimum amount of tetrahydrofuran. The resultant mixture is shaken vigorously for one minute and allowed to stand at room temperature overnight. The mixture is filtered and about 200 ml. of ether is added. The mixture filtered again, and the ether solution washed with 2×100 ml. saturated sodium bicarbonate solution, 3×100 ml. water, dried over anhydrous sodium sulfate and filtered. The solvent is removed in vacuo to give p-nitrophenyl nicotinate.

(B) *t-Butyl - α - (1-nicotinoyl-2-methyl-5-methoxy-3-indolyl)-α-(O-benzyloximino) acetate.*—To an ice-cooled mixture of 0.01 mole of t-butyl-α-(2-methyl-5-methoxy-3-indolyl)-α-(O-benzyloximino)-acetate in 50 ml. anhydrous dimethylformamide is added 0.011 mole sodium hydride (50% suspension in mineral oil) and the mixture stirred cold, for one-half hour. A solution of 0.011 mole of p-nitrophenyl nicotinate in a minimum amount of dimethylformamide is added to the cold mixture over a period of about ten minutes, and the resulting mixture is stirred overnight at a temperature below 10° C. Ether is added, the mixture stirred vigorously, filtered, the filtrate washed with 2×100 ml. saturated sodium bicarbonate solution, 3×100 ml. water, and the filtrate dried over anhydrous potassium carbonate. After filtering, the solvent is removed in vacuo and the residue chromatographed on a 150 g. alumina column using ether-petroleum ether (v./v. 30–100%) and ethyl acetate-ether (v./v. 0–100%) eluents to give t-butyl-α-(1-nicotinoyl-2 - methyl-5-methoxy - 3 - indolyl-α-(O-benzyloximino) acetate.

Similarly, when using the aroyl compounds indicated in Example 10 in place of p-nitrophenyl nicotinate, there are obtained the corresponding t-butyl-1-aroyl-2-methyl-5-methoxy-3-indolyl-α-(O-benzyloximino)-acetate.

In like manner, when using the t-butyl-α-(substituted-3-indolyl)-α-(O-benzyloximino) acetates obtained from Example 28, in place of t-butyl-α-(2-methyl-5-methoxy-3-indolyl)-α-(O-benzyloximino)-acetate, there are obtained the corresponding t-butyl-α-(1-nicotinyl-substituted-3-indolyl)-α-(O-benzyloximino)-acetate.

Similarly, the 2-methyl-5-methoxy-3-indolyl-α-(O-benzyloximino)-substituted amides obtained from Example 28 are used in place of t-butyl-α-(2-methyl-5-methoxy-3-indolyl)-α-(o-benzyloximino)-acetate. There are obtained the corresponding 1-nicotinyl-2-methyl-5-methoxy-3-indolyl-α-(O-benzyloximino)-substituted-amides.

EXAMPLE 30

The procedure of Example 29 is followed using the following heteroaroyl chlorides in place of p-nitrophenyl nicotinate to produce the corresponding N-1 heteroaroyl derivatives of the α-indolyl-α-(O-benzyloximino) acetate esters:

1-methylimidazol-5-carboxy chloride;
1,3-dimethyl-2,3-dihydro-2-oxoimidazole-4-carboxy chloride;
1-methyl-benzimidazol-2-carboxy chloride;
1-methyl-indazole-3-carboxy chloride;
1-methyl-6-nitro indazole-3-carboxy chloride;
oxazole-4-carboxy chloride;
benzyoxazole-2-carboxy chloride;
thiazole-4-carboxy chloride;
thiazole-2-carboxy chloride;
2-phenylthiazole-4-carboxy chloride;
2-benzylmercoptothiazole-4-carboxy chloride.

The acylation procedure of Example 29 may be similarly used to produce the corresponding propionate esters of Example 9 with the above reagents.

EXAMPLE 31 t-Butyl-α-(1-nicotinoyl-2-methyl-5-methoxy-3-indolyl)-α-aminoacetate

A mixture of 0.01 mole of t-butyl-α-(1-nicotinoyl-2-methyl-5-methoxy-3-indolyl)-α-(O-benzyloximino) - acetate, 50 ml. of ethanol, and 0.03 mole of 38% hydrochloric acid is reduced under a 3000 p.s.i. hydrogen pressure at room temperature in the presence of 2 g. of 5% palladium on carbon. The mixture is then filtered and the residue rinsed with a small amount of 2.5 N hydrochloric acid. Approximately 100 ml. 2.5 N hydrochloric acid is added to the combined filtrate and rinsings, and the aqueous solution washed with 2×100 ml. ether. After making the aqueous mixture slightly alkaline with concentrated ammonium hydroxide, it is extracted with 3×100 ml. chloroform. The combined chloroform extracts are washed with 2×100 ml. water, dried over anhydrous potassium carbonate, the chloroform removed in vacuo. The residue is chromatographed on a 250 g. alumina column using ethyl acetate-ether (v./v. 0–100%) as eluent to give α - (1-nicotinoyl-2-methyl-5-methoxy-3-indolyl)-α-aminoacetate.

Similarly, when using the t-butyl-α-,1-acyl-2-methyl-5-methoxy - 3 - indolyl)-α-(O-benzyloximino)-acetates obtained from Example 29, there are obtained the corresponding t-butyl-α-(1-aroyl - 2 - methyl-5-methoxy-3-indolyl)-α-aminoacetates.

Similarly, when using the t-butyl-α-(1-nicotinoyl-substituted-3-indolyl)-α-(O-benzyloximino)-acetates obtained from Example 29, there are obtained the corresponding t - butyl - α - (1 - nicotinoyl - substituted - 3 - indolyl)-α-aminoacetates.

Utilizing the process of this example, the propionate esters of Example 30 produce similar β-indolyl-α-aminopropionates, for example:

t-butyl-β-(1-nicotinoyl-2-methyl-5-methoxy-3-indolyl)-α-aminopropionate;
benzyl-β-[1-(4-thiazolecarbonyl)-2-ethyl-5-trifluoromethyl-3-indolyl]-α-aminopropionate.

EXAMPLE 32

α-Morpholino-2-methyl-5-methoxy indole-3-acetic acid ethyl ester

To a solution of 0.11 mole of glyoxylic acid ethyl ester is added 0.11 mole of morpholine at 0–4° C. in 30 parts by volume of dimethylformamide, and on completion of the addition, the entire mixture is stirred for one hour at room temperature. To this mixture is added .10 mole of 2-methyl-5-methoxy indole in small portions at a temperature between 0 and 4° C. After the reaction mixture has attained room temperature, it is stirred for 2 hours at room temperature and finally heated for 3–7 hours at 30–80° C. The dimethylformamide is distilled off in vacuo under a nitrogen atmosphere and the residue dissolved in ether. The ethereal solution is extracted at 0° with 2 N hydrochloric acid or with 2 N tartaric acid and the extracts are made alkaline, while remaining cool, with 2 N sodium hydroxide. The oily base which separates is extracted with ether, washed with water and dried over sodium sulfate. After distilling off the solvent, the residue is crystallized with ether-petroleum ether, ether cyclohexane to obtain α-morpholino-2-methyl-5-methoxy indole-3-acetic acid ethyl ester.

Similarly when piperazine, acetyl piperazine, piperadine and pyrrolidine are used in place of morpholine in the above example, there are obtained α-piperazino-2-methyl-5-methoxy-indole-3-acetic acid ethyl ester, α-acetal piperazino-2-methyl-5-methoxy-indole-3-acetic acid ethyl ester, α-piperadino-2-methyl-5-methoxy-indole-3-acetic acid ethyl ester, and α-Pyrrolidino-2-methyl-5-methoxy-indole-3-acetic acid ethyl ester, respectively.

Similarly, when dimethylamine, cyclohexylamine and 1,2,5,6 tetrahydropyridine are used in place of morpholine, there are obtained α-N,N-dimethylamino-2-methyl-5-methoxy-indole-3-acetic acid ethyl ester, α-N-cyclohexylamine-2-methyl-5-methoxy-indole-3-acetic acid ethyl ester and α-N-1,2,5,6 tetrahydropyridine - 2 - methyl-5-methoxy-indole-3-acetic acid ethyl ester, respectively.

Similarly, when using the substituted indoles (excluding those with an active hydrogen on other than the N-1 position) from Example 2 in place of 2-methyl-5-methoxy-indole, there are obtained the corresponding α-morpholino-substituted indole-3-acetic acid esters.

Similarly, when glyoxalamide, substituted glyoxalamides, glyoxalic acid benzyl ester are used in place of glyoxalic acid ethyl ester, there is obtained the corresponding amide and benzyl ester.

EXAMPLE 33

α-Morpholino-1-(p-chlorobenzoyl)-2-methyl-5-methoxy-indole-3-acetic acid ethyl ester A solution of .021 mole of α-morpholino-2-methyl-5-methoxyindole-3-acetic acid ethyl ester in 20 ml. of dimethylformamide is added dropwise to a cold suspension of .022 mole of sodium hydride (52% dispersion in mineral oil) in 20 ml. of dimethylformamide. The mixture is stirred at room temperature for 20 minutes, cooled and treated with .022 mole of p-chlorobenzoyl chloride. The reaction mixture is stirred at room temperature for about 16 hours and poured into 60 ml. of ice water. The aqueous mixture is extracted with 3–250 ml. portions of ether. The ether extract is washed with 100 ml. of potassium bicarbonate solution and 3–100 ml. portions of water. The ether layer is dried and concentrated at reduced pressure to give α-morpholino-1-(p-chlorobenzoyl)-2-methyl-5-methoxyindole-3-acetic acid ethyl ester.

Similarly, when using the α-substituted amino-substituted-3-indole acetic acid compounds of Example 32, in place of α-morpholino-2-methyl-5-methoxyindole-3-acetic acid ethyl ester, there are obtained the corresponding α-substituted amino-1-(p-chlorobenzoyl)-substituted-3-indole acetic acid compounds.

EXAMPLE 34

1-(p-chlorobenzoyl)-2-methyl-5-methoxy-3-indolyl-α-methylamino acetic acid ethyl ester (A) *2-methyl - 5 - methoxy - 3 - indolyl-α-(N-methyl, N-carbobenzyloxy) aminoacetic acid ethyl ester.*—To a solution of 0.11 mole of glyoxylic acid ethyl ester is added 0.11 mole of methylamine at 0–4° C., in 30 parts of dimethylformamide. On completion of the addition, the entire mixture is stirred for one hour at room temperature. To this mixture is added 0.15 mole of carbobenzyloxy chloride in 150 ml. of dimethylformamide, and the resulting solution is stirred at 10° C. for four hours. A total of 0.10 mole of 2-methyl-5-methoxy-indole is added and the mixture stirred at room temperature for two hours and then the solvent is distilled off in vacuo under nitrogen. The residue is dissolved in ether and the latter solution is extracted with weak acid and then made alkaline and evaporated in vacuo to produce 2-methyl-5-methoxy - 3 - indolyl - α - (N-methyl,N-carbobenzyloxy) aminoacetic ethyl ester.

When any compound containing a primary amino group is substituted in the above reaction in place of methylamine, the corresponding indolyl protected aminoacetate is produced.

(B) *1-(p-chlorobenzoyl) - 2 - methyl-5-methoxy-3-indolyl - α - (N-methyl,N-carbobenzyloxy)aminoacetic acid ethyl ester.*—The product of Part A is reacted according to the procedure of Example 33 to produce 1-(p-chlorobenzoyl) - 2 - methyl - 5 - methoxy-3-indolyl-α-(N-methyl, N-carbobenzyloxy)aminoacetic ethyl ester.

(C) *1-(p-chlorobenzoyl) - 2 - methyl - 5 - methoxy-3-indolyl-α-methylamino acetic acid ethyl ester.*—When the product of Part B of this example is hydrogenated, using the procedure of Example 8B, 1-(p-chlorobenzoyl)-2-methyl-5-methoxy-3-indolyl - α - methylamino acetic acid ethyl ester is produced.

EXAMPLE 35

2-methyl-5-methoxygramine

A solution of 0.1 mole of 2-methyl-5-methoxy-indole in 10 ml. of a 37% formaldehyde-water mixture and 0.1 mole of dimethylamine is warmed over the steam bath. The resulting clear solution is dried over potassium hydroxide in a vacuum desiccator to produce 2-methyl-5-methoxygramine.

Utilizing the procedure of this example, the following compounds are prepared:

2-ethyl-5-fluorogramine;
2-benzyl-5-nitrogramine.

EXAMPLE 36

(A) *Ethyl-β-(2-methyl-5-methoxy-3-indolyl)-α-methyl-α-nitropropionate.*—2 - methyl-5-methoxygramine (0.025 mole), 0.025 mole of ethyl-α-nitropropionate and 0.2 mole of dry xylene are refluxed, with stirring, until dimethylamine evolution has practically stopped; a rapid stream of nitrogen is passed through the solution during reflux to remove the dimethylamine. The solution is cooled to room temperature, washed with 2 N hydrochloric acid, 2 N sodium hydroxide, then water and dried over magnesium sulfate to yield ethyl-β-(2-methyl-5-methoxy-3-indole)-α-methyl-α-nitropropionate.

Utilizing the procedure of this example, the following compounds are prepared:

ethyl-β-[2-(2,4-dimethylhexyl)-5-chloro-3-indolyl]-α-methyl-α-nitropropionate;
ethyl-β-(2-benzyl-5-nitro-3-indolyl)-α-methyl-α-nitropropionate.

(B) By using the procedure of Part A on esters of different α-nitro acids, the following compounds are prepared:

methyl-β-[2-(t-butyl)-5-trifluoromethyl-3-indolyl]-α-(t-butyl)-α-nitropropionate;
isopropyl-β-(2-phenyl-5-hydroxy-3-indolyl)-α-(n-propyl)-α-nitropropionate.

EXAMPLE 37

β-(2-methyl-5-methoxy-3-indolyl)-α-methyl-α-nitropropionic acid

Ethyl - β - (2-methyl-5-methoxy-3-indolyl)-α-methyl-α-nitropropionate (30 g.) is refluxed with 120 ml. of 20% sodium hydroxide until the ester odor is no longer apparent. The alcohol (ethyl) is distilled off and the alkaline solution is neutralized with dilute sulfuric acid and evaporated to dryness to produce β-(2-methyl-5-methoxy-3-indolyl)-α-methyl-α-nitropropionic acid.

Similarly, when any other α-nitropropionic ester is used in the above procedure, the corresponding free acid is produced.

EXAMPLE 38 t-Butyl-β-(2-methyl-5-methoxy-3-indolyl)-α-methyl-α-nitropropionate

By treating β - (2 - methyl - 5 - methoxy - 3 - indolyl)-α-methyl-α-nitropropionic acid by the procedure of Example 7, Part A, t-butyl-β-(2-methyl-5-methoxy-3-indolyl)-α-methyl-α-nitropropionate is prepared.

Similarly, using the procedures of Parts B, C and D of Example 7, there are obtained the corresponding esters of β-(2-methyl-5-methoxy-3-indolyl) - α - methyl-α-nitropropionic acid.

EXAMPLE 39 t-Butyl-β-[1-(p-chlorobenzoyl)-2-methyl-5-methoxy-3-indolyl]-α-methyl-α-nitropropionate By treating t-butyl-β-(2-methyl-5-methoxy-3-indolyl)-α-methyl-α-nitropropionate by the precedure outlined in Example 10, t-butyl - β - [1-p-chlorobenzoyl)-2-methyl-5-methoxy-3-indolyl] - α - methyl-α-nitropropionate is prepared.

Using the procedure of this example, the following compounds are prepared:

methyl-β-[1-(p-dimethylaminobenzoyl-2-(n-propyl)-5-isopropoxy-3-indolyl]-α-methyl-α-nitropropionate;
isobutyl-β-[1-(p-formylbenzoyl)-2-methyl-5-benzyloxy-3-indolyl]-α-isopropyl-α-nitropropionate.

EXAMPLE 40 t-Butyl-β-[1-(p-chlorobenzoyl)-2-methyl-5-methoxy-3-indolyl]-α-methyl-α-aminopropionate By treating t-butyl-β-(2-methyl-5-methoxy-3-indolyl)-α-methyl-α-nitropropionate by the precedure outlined in Example 21, Part B, t-butyl-β-[1-(p-chlorobenzoyl)-2-methyl-5-methoxy-3-indolyl]-α - methyl - α-aminopropionate is prepared.

Similarly, when any other α-nitropropionate or indolyl-α-nitro propionic acid is used in the above procedure, the corresponding α-amino ester or acid is produced.

EXAMPLE 41

α-[1-(p-chlorobenzoyl)-2-methyl-5-methoxy-3-indolyl]-sarcosin

A mixture of 0.005 mole of t-butyl-α-[1-(p-chlorobenzoyl)-2-methyl-5 - methoxy-3-indolyl]-α - methylaminoacetate and about 1 g. of fine porous-plate chips in a nitrogen atmosphere is heated slowly in an oil-bath until isobutylene starts to escape. Stirring is initiated, and the temperature held constant for ca. one hour. On cooling, the residue is extracted with saturated sodium bicarbonate solution, filtered, the aqueous solution washed with 100 ml. ether, made neutral with 1 N hydrochloric acid and lyophilized to give α-[1-(p-chlorobenzoyl)-2-methyl-5-methoxy-3-indolyl]-sarcosin.

Similarly, when using any of the t-butyl esters indicated in the previous examples in this procedure, the corresponding free acids are obtained, for example:

β[1-(p-methylthiobenzoyl)-2-benzyl-5-cyclobutylmethyloxy-3-indolyl]-α-aminopropionic acid;
α-1-(2,4-dichlorobenzoyl)-2-phenyl-5-dimethylamino-3-indolyl-α-aminoacetic acid;
β-[1-(oxazole-4-carboxy)-2-isobutyl-5-p-chloro-benzyloxy-3-indolyl]-α-methyl-α-aminopropionic acid.

EXAMPLE 42

(A) *Sodium α-[1-(p-chlorobenzoyl)-2-methyl - 5 - methoxy-3-indolyl]-α - aminoacetate.* — α-[1 - (p - chlorobenzoyl)-2-methyl-5-methoxy-3 - indolyl α - aminoacetate acid (0.001 mole) is added to a stirred solution of sodium hydroxide (0.001 mole) in 100 ml. of water. The mixture is stirred until solution is complete, filtered, and the water removed in vacuo, to give sodium-α-[1-(p-chlorobenzoyl)-2-methyl-5-methoxy-3-indolyl]-α-aminoacetate.

Similarly, there may be prepared the calcium and aluminum salts as well as other salts such as potassium, iron and magnesium of the α-(substituted or unsubstituted) amino-3-indolyl lower aliphatic acid compounds described in the accompanying examples, such as:

calcium β-[1-(N,N-dimethyl-p-carboxamidobenzoyl)-2-n butyl-5-isopropoxy-3-indolyl] - α-isopropyl - α - aminopropionate;
potassium α-[1-(1,3-dimethyl-2,3-dihydro-2-oxoimidazole-4-carboxy) - 2-ethyl-5-ethoxy-3-indolyl]-α-ethyl-α-aminoacetate.

(B) To a solution of 0.01 mole of β[1-(p-chlorobenzoyl) 2-methyl-5-methoxy-3-indoyl]-α-aminoacetate acid in 100 ml. of ether, at 0° C., is added a solution of 0.01 mole of morpholine in 50 ml. of ether, dropwise, with stirring. The mixture is filtered and the resulting crystalline morpholine salt of α-[1-(p-chlorobenzoyl)-2-methyl-5-methoxy-3-indolyl]-α-aminoacetic acid is dried in vacuo.

In a similar fashion, there may be prepared salts of organic bases such as triethylamine, ethanolamine, n-butylamine, 2,3-xylidine, choline and piperazine by the reaction of these compounds with the various 3-indolyl lower aliphatic acids described in the accompanying examples.

EXAMPLE 43.—PREPARATION OF ANHYDRIDES (A) *1-(p-chlorobenzoyl)-2-methyl-5-methoxy-3-indolyl-α-dimethylaminoacetic anhydride*

Dicyclohexylcarbodiimide (.049 M), is dissolved in a solution of 1-(p-chlorobenzoyl)-2-methyl-5 - methoxy-3-indolyl α-dimethylaminoacetic acid (.10 M) in 200 ml. of tetrahydrofuran, and the solution is allowed to stand at room temperature for 2 hours. The precipitated urea is removed by filtration and the filtrate is evaporated in vacuo to a residue and flushed with Skellysolve B.

(B) *1-(p-chlorobenzoyl)-2-methyl-5-methoxy-3-indolyl-α-methylaminoacetic anhydride*

(1) To 0.2 mole of 1-(p-chlorobenzoyl)-2-methyl-5-methoxy-3-indolyl α-methylaminoacetic acid is added 0.15 mole of benzylosulfonyl chloride in 200 ml. of dimethylformamide. The solution is stirred at 15° C. until all reaction ceases. The reaction mixture is extracted with hot water and the solvent evaporated in vacuo to produce the sulfonated amino derivative.

(2) The product thus prepared is treated according to the procedure of Part A of this example to produce the corresponding sulfonate amino anhydride.

(3) This latter intermediate is hydrogenated using the procedure of Example 21B to yield 1-(p-chlorobenzoyl)-2 - methyl - 5 - methoxy - 3 - indolyl - α - methylaminoacetic anhydride.

(C) *Isobutyl - [1 - (p - chlorobenzoyl) - 2 - methyl - 5-methoxy-3-indolyl]-α-aminoacetic anhydride*

(1) To a solution of 0.02 mole of 1-(p-chlorobenzoyl)-2-methyl-5-methoxy-3-indolyl-α-aminoacetic acid and 0.021 mole of benzaldehyde in 100 ml. of dimethoxy-ethane is added 16 g. of a 40% alcoholic solution of trimethylbenzyl ammonium hydroxide. The reaction mixture is stirred at 0° C. for four hours, then overnight at room temperature and then is poured into an ice-water mixture, acidified with 2.5 N hydrochloric acid and worked with ether. The water layer is concentrated in vacuo to produce the α-benzylidenyl imine of the starting acid.

(2) The product thus prepared, dissolved in 100 ml. of dimethoxyethane, is treated with 0.01 mole of triethylamine, with ice-cooling and stirring. After one hour, 0.011 mole of isobutyl chloroformate is added dropwise and the mixture stirred for 4 to 8 hours at 0° to 5° C. The solution is filtered to remove precipitated triethylamine hydrochloride and evaporated in vacuo to give a concentrated solution of the mixed anhydride with the α-amino group still protected. This solution is stirred with 50 ml. of 0.1 N hydrochloric acid in aqueous dioxane for 2 hours at 15°–20° C. and then evaporated in vacuo to produce isobutyl - [1 - (p - chlorobenzoyl) - 2 - methyl - 5 - methoxy-3-indolyl]-α-aminoacetic anhydride.

In a like manner, using equivalent quantities of ethyl chloroformate, propylchloroformate, phenyl chloroformate, p-nitrophenyl chloroformate and methyl chloroformate in the procedure of this part in place of isobutyl chloroformate, the corresponding mixed anhydrides are produced.

(D) When an equivalent quantity of any indolyl acid prepared heretofore is used in the procedures of this example, the corresponding symmetrical or mixed anhydride is produced.

EXAMPLE 44

*1-(p-chlorobenzoyl)-2-methyl-5-hydroxy-3-indolyl-α-aminoacetic acid*

1 - (p - chlorobenzoyl) - 2 - methyl - 5 - methoxy - 3-indolyl-α-aminoacetic acid (0.001 mole) is added, in small amounts, with stirring, to 1.5 g. of pyridine hydrochloride to 160°–220° C. On cooling, the residue is extracted with saturated sodium bicarbonate solution, the aqueous solution made neutral with 1.0 N hydrochloric acid to yield 1-(p-chlorobenzoyl)-2-methyl-5-hydroxy-3-indolyl-α-aminoacetic acid.

The propionic acid compounds containing a 5-hydroxy substituent are prepared in similar fashion.

EXAMPLE 45

(A) *t-Butyl-α-[1-(p-chlorobenzoyl)-2-methyl-5-methoxy-3-indolyl]-α-methyl-α-methylaminoacetate.*—The procedure of Example 17 is employed using t-butyl-α-[1-(p-chlorobenzoyl) - 2-methyl - 5 - methoxy - 3 - indolyl]-α-methyl-α-aminoacetate to produce the desired compound.

Similarly, the following compounds are prepared:

methyl - β - [1 - (N,N - dimethyl - p - sulfonamidobenzoyl) - 2 - propyl - 5 - benzylthio - 3 - indolyl] - α - ethylaminopropionate;

t - butyl - β - [1 - (p - N,N - dimethylsulfamylbenzoyl) - 2 - (t - butyl) - 5 - chlorobenzylthio - 3 - indolyl] - α - n-propylaminopropionate;

methyl - α - [1 - (2,4,5 - trichlorobenzoyl) - 2 - cyclopropyl - 5 - bis (hydroxyethyl) amino - 3 - indolyl - α-ethyl-α-isobutylaminoacetate.

(B) Similarly, when α-amino lower aliphatic acid esters are reacted according to the procedures of Examples 12, 13 and 14, the following compounds are prepared:

t - butyl - α - [1 - (p - chlorobenzoyl) - 2 - methyl - 5 - (1'-pyrrolidino) - 3 - indolyl] - α - (1' - pyrrolidino) - α-methylacetate;

methyl β - [1 - (p - methylthiobenzoyl) - 2 - isopropyl - 5 - methoxy - 3 - indolyl] - α - [bis β - hydroxyethyl) amino]-α-isobutylpropionate;

ethyl β - [1 - (3,4,5 - trimethoxybenzoyl) - 2 - benzyl - 5 - benzyloxy - β - indolyl] - α - (4' - morpholinyl)propionate.

EXAMPLE 46

(A) *N,N - dimethyl - α - [1 - (p - chlorobenzoyl) - 2-methyl - 5 - methoxy - 3 - indolyl] - α - aminoacetamide.*—
A solution of α-[1-(p-chlorobenzoyl)-2-methyl-5-methoxy-3-indolyl]-α-aminoacetic acid anhydride in ethanol is treated with a one molar solution of dimethylamine in ethanol. The resulting solution is concentrated in vacuo to produce N,N-dimethyl-α-[1-(p-chlorobenzoyl)-2-methyl-5-methoxy-3-indolyl]-α-aminoacetamide.

(B) Utilizing the procedure of Part A, but substituting an equivalent quantity of isopropylamine, diethanolamine, aniline, monomethylaniline, benzylamine, p-chloroaniline, β-methoxyethylamine, morpholine and p-methoxyaniline in place of the dimethylamine used therein, there are obtained the corresponding n-substituted α-amino-acetamides.

Similarly, reacting the amine reagents of this part with β - (1 - p - chlorobenzoyl - 2 - methyl - 5 - methoxy - 3-indolyl) α-aminopropionic acid anhydride in the procedure of Part A will yield the corresponding N-substituted-α-amino propionamides.

(C) The procedure of Part A of this example is followed, using dry ammonia gas in place of dimethylamine. The ammonia is bubbled through the solution of the anhydride to produce α-[1-(p-chlorobenzoyl)-2-methyl-5-methoxy-3-indolyl]-α-aminoacetamide.

(D) Utilizing the procedures of this example, the following compounds are prepared:

(N - methyl - 2 - hydroxymethylpyrrolidyl) - β - [1 - (p-mercaptobenzoyl - 2 - (3,4,5 - trimethylpentyl) - 5 - isobutyl - 3 - indolyl]-α-benzylamino α-isopropylpropionamide;

morpholino - α - 1 - (1 - methyl-benzimidazol - 2 - carboxy) - 2 - (p - tolyl) - 5 - (o - fluorobenzylthio) - 3-indolyl-α-(N-piperazino) acetamide;

tetrahydrofurfurylamino - β - [1 - (p - acetaminobenzoyl)-2 - (2 - methyl - 3 - ethyl - n - butyl) - 5 - (o - ethoxybenzoyloxy) - 3 - indolyl]-methylamino-α-methylpropionamide.

EXAMPLE 47

*1-(p-chlorobenzoyl)-2-methyl-5-methoxy-3-indolylglyoxylic acid*

To a stirred solution of .005 mole of oxalyl chloride in 15 ml. of anhydrous ether is added a solution of .005 mole of 1-(p-chlorobenzoyl)-2-methyl-5-methoxyindole in 15 ml. of ether over a period of approximately 30 minutes. The mixture is then stirred several hours under a blanket of nitrogen. The mixture is concentrated to approximately ½ the volume, 1.5 ml. of water is added and the mixture is stirred for several hours. After removal of the ether and excess butanol, the residue is chromatographed on a 100 g. silica gel column using ether-petroleum ether (v./v. 10–100%) as eluent to give 1-(p-chlorobenzoyl-2-methyl-5-methoxy-3-indolylglyoxylic acid.

When the free acid is desired, the acylation is run first. This avoids the reaction of the acyl groups with the free acid. When the amide is desired, ammonia water can be used in place of water, and when the alkali salt is desired, a solution of sodium hydroxide may be used in place of water.

EXAMPLE 48

*t-Butyl-[1-(p-methoxylbenzoyl)-2-methyl-5-hydroxy-3-indole]-α-aminoacetate*

A mixture of .05 of a mole of t-butyl-[1-(p-methoxybenzoyl)-2-methyl-5-benzyloxy - 3 - indolyl]-oximeacetate in 200 ml. of ethanol is reduced with 10% palladium on carbon under 45 p.s.i. of hydrogen at room temperature until .05 of a mole of hydrogen is absorbed. The mixture is filtered, evaporated in vacuo and chromatographed on a silica gel column (800 g.) using ether-petroleum ether (v./v. 50–100%) as eluent. The solvent is evaporated and the produce is recovered.

Similarly, when using t-butyl-[1-(p-methoxybenzoyl)-2 - methyl - 5 - bis(1 - benzyloxyethylamino)indolyl]-oximeacetate, t-butyl-[1-(p-methoxybenzoyl)-2-methyl-5-bis(1-benzyloxybutyl)-amino indolyl] - oximeacetate and t-butyl-[1-(p - methoxybenzoyl) - 2 - methyl - 5 - bis(1-benzyloxypentylamino)indolyl]-oximeacetate in place of t-butyl-[1-(p-methoxybenzoyl) - 2 - methyl - 5-benzyloxyindolyl]-oximeacetate, there are obtained, t-butyl-[1-(p-methoxybenzoyl)-2-methyl-5-bis(1 - hydroxyethylamino)-3-indolyl]-α-aminoacetate, t - butyl-[1-(p - methoxybenzoyl) - 2-methyl-5-bis(1 - hydroxybutylamino)-3-indolyl]-α-aminoacetate and t-butyl-[1-(p-methoxybenzoyl)-2-methyl-5-bis(1-hydroxypentylamino) - 3 - indolyl] - α - aminoacetate, respectively.

EXAMPLE 49

*t-Butyl-[1-(p-chlorobenzoyl)-2-methyl-5-hydroxy-3-indolyl]-α-aminoacetate*

A mixture of 1 part of t-butyl-[1-(p-chlorobenzoyl)-2-methyl-5-benzyloxy-3-indolyl]-oximeacetate and 10 parts of pyridine hydrochloride is heated at 160° for approximately 1 hour under a blanket of nitrogen. The reaction mixture is cooled and poured into water. This solution is then extracted with (2×100 ml.)ether. The ether extract is chromatographed on a silica gel column using ether-petroleum ether (v./v. 50–100%) as eluent. The solvent is evaporated and the product recovered.

Similarly, when other N-1 substituted indoles with lower alkoxy at the 5-position are used, there are obtained the corresponding 5-hydroxy compounds.

Similarly, when using t-butyl-[1-(p-chlorobenzoyl)-2-methyl - 5 - bis(1 - benzyloxyethylamino) - 3 - indolyl]-oximeacetate, t-butyl-[1-(p-chlorobenzoyl) - 2-methyl-5-bis(1-benzyloxybutylamino) - 3 - indolyl]oximeacetate and t-butyl-[1-(p-chlorobenzoyl)-2-methyl-5-bis(1-benzyloxypentylamino - 3 - indolyl]-oximeacetate in place of t-butyl-[1-(p-chlorobenzoyl) - 2 - methyl - 5 - benzyloxy-3-indolyl]-oximeacetate, there are obtained t-butyl-[1-p-chlorobenzoyl)-2-methyl-5 - bis(1-hydroxyethylamino)-3-indolyl]-α-aminoacetate, t - butyl-[1-(p-chlorobenzoyl)-2-methyl-5-bis(1-hydroxy butylamino)-3-indolyl]-α-aminoacetate and t-butyl-[1-(p-chlorobenzoyl) - 2 - methyl-5-bis(1-hydroxypentylamino)-3-indolyl] - α - aminoacetate, respectively.

EXAMPLE 50

*α-Morpholino-1-(p-trifluoromethylbenzoyl)-2-methyl-5-methoxyindole-3-acetic acid ethyl acetate*

.11 mole of morpholine is added dropwise, at 0° to 4°. After the reaction mixture has attained room temperature, it is stirred for 2 hours at this temperature and finally, it is heated for 3–7 hours at 30°. The dimethylformamide is distilled off in vacuo in a nitrogen atmosphere and the residue is dissolved in ether. The ethereal solution is then extracted with ice-water cooled with 2 N hydrochloric acid or with 2 N tartaric acid and the extracts are each immediately made alkaline while cooling well with 2 N caustic soda. The material which separates is extracted with ether. The ethereal solution is washed with water and dried over sodium sulfate. After distilling off the solvent, the residue is crystallized from ether-petroleum ether and ether-cyclohexane to yield α-morpholino - 1 - (p - trifluoromethylbenzoyl) - 2 - methyl - 5-methoxyindole-3-acetate acid ethyl acetate.

EXAMPLE 51

*α-Pyrrolidino-1-(p-chlorobenzoyl)-2-methyl-5-methoxyindole-3-acetic acid*

To a solution of .11 mole of glyoxylic acid is added .11 mole of pyrrolidine at 0–4° C. in 30 parts by volume of dimethylformamide, and on completion of the addition, the entire mixture is stirred for one hour at room temperature. To this mixture is added .10 mole of 1-(p-chlorobenzoyl)-2-methyl-5-methoxyindole in small portions at a temperature between 0 and 4° C. After the reaction mixture has obtained room temperature, it is stirred for 2 hours at room temperature and finally heated for 3–7 hours at 30–80° C. The dimethylformamide is distilled off in vacuo under a nitrogen atmosphere and the residue dissolved in ether. The ethereal solution is extracted at 0° with 2 N hydrochloric acid or with 2 N tartaric acid and the extracts are made alkaline, while remaining cool, with 2 N sodium hydroxide. The oily base which separates is extracted with ether, washed with water and dried over sodium sulfate. After distilling off the solvent, the residue is crystallized with ether-petroleum ether, ether-cyclohexane to obtain α-pyrrolidino-1-(p-chlorobenzoyl)-2-methyl-5-methoxyindole-3-acetic acid.

EXAMPLE 52

*α-Cyclohexylamino-1-(p-methylthiobenzoyl)-2-methyl-5-fluoro-indole-3-acetic acid*

To a solution of .11 mole of glyoxylic acid is added .11 mole of cyclohexylamine at 0–4° C. in 30 parts by volume of dimethylformamide, and on completion of the addition, the entire mixture is stirred for one hour at room temperature. To this mixture is added .10 mole of 2-methyl-1-(p-methyl-thiobenzoyl)-2-methyl-5-fluoroindole in small portions at a temperature between 0 and 4° C. After the reaction mixture has obtained room temperature, it is stirred for 2 hours at room temperature and finally heated for 3–7 hours at 30–80° C. The dimethylformamide is distilled off in vacuo under a nitrogen atmosphere and the residue dissolved in ether. The ethereal solution is extracted at 0° with 2 N hydrochloric acid or with 2 N tartaric acid and the extracts are made alkaline, while remaining cool, with 2 N sodium hydroxide. The oily base which separates is extracted with ether, washed with water and dried over sodium sulfate. After distilling off the solvent, the residue is crystallized with ether-petroleum ether, ether cyclohexane to obtain α-cyclohexylamino-1-(p - methylthiobenzoyl)-2-methyl-5-fluoro-indole-3-acetic acid.

EXAMPLE 53

*t-Butyl-[1-(p-chlorobenzoyl)-2-methyl-5-nitro-3-indolyl]-glyoxalate*

To a stirred solution of .005 mole of oxalyl chloride in 15 ml. of anhydrous ether is added a solution of .005 ml. of 1-(p-chlorobenzyl)-2-methyl-5-nitro-indole in 15 ml. of ether over a period of approximately 30 minutes. The mixture is then stirred several hours under a blanket of nitrogen. The mixture is concentrated to approximately ½ the volume, 4 ml. of t-butanol is added and the mixture is stirred for several hours. After removal of the ether and excess t-butanol, the residue is chromatographed on a 100 gm. silica gel column using ether-petroleum-ether (v./v. 10–100%) as eluent to give t-butyl-[1-(p-chlorobenzoyl)-2-methyl - 5 - nitro - 3 - indolyl]-glyoxalate.

EXAMPLE 54

*t-Butyl-[1-(p-chlorobenzoyl)-2-methyl-5-amino-3-indolyl]-glyoxalate*

To a solution of .01 mole of t-butyl [1-(p-chlorobenzoyl)-2-methyl-5-nitro-3-indolyl]-glyoxalate in 30 ml. of ethanol is added 0.04 mole of 38% of hydrochloric acid and the mixture reduced under 40 p.s.i. at room temperature in the presence of 5% palladium on charcoal. The mixture is then filtered and 50 ml. of 2.5 N hydrochloric acid is added. The aqueous phase is washed with 2×50 ml. of chloroform, cooled, made slightly alkaline with concentrated ammonium hydroxide and extracted with 3×50 ml. of chloroform. The chloroform extracts are combined, washed with 2×100 ml. of water, dried over anhydrous potassium carbonate, filtered, the solvent removed in vacuo and the residue chromatographed on a 200 gm. alumina column with an ethyl acetate-ether (v./v. 10–100% solvent system) to give t-butyl [1-(p-chlorobenzoyl)-2-methyl-5-amino-3-indolyl]-glyoxalate.

EXAMPLE 55

*t-Butyl-[1-(p-chlorobenzoyl)-2-methyl-5-methylamino-3-indolyl]-glyoxalate*

A mixture of .01 mole of t-butyl-[1-(p-chlorobenzoyl)-methyl-5-amino-3-indolyl]-glyoxalate in 0.011 mole of methyl iodide and 0.015 mole of sodium bicarbonate and 0 ml. of anhydrous 1,2-dimethoxyethane are heated on steam bath under nitrogen for 3 hours. The solution is filtered, the solvent is removed in vacuo and the residue chromatographed on a 150 neutral alumina column using petroleum-ether (v./v. 20–100%) as eluent to give t-butyl-1 - (p - chlorobenzoyl) - 2 - methyl - 5 - methylamino-3-indolyl]-glyoxalate.

I claim:
1. A compound of the formula

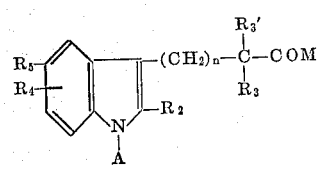

in which $n$ is an integer less than 2;
$R_2$ is selected from the group consisting of hydrogen, alkenyl, alkyl, cycloalkyl, phenyl and benzyl;
$R_3$ is selected from the group consisting of amino, lower monoalkylamino, lower dialkylamino, benzylamino, N-lower alkyl benzylamino, cyclohexylamino, pyrrolidino, piperidino, tetrahydropyridino, morpholino, piperazino, acetyl-piperazino, N-methylpiperazino, N-(β-hydroxyethyl)piperazino, β-diloweralkylamino ethylamino, N-diethanolamino and β-hydroxyethylamino;
$R_3'$ is selected from the group consisting of hydrogen, lower alkyl and lower alkenyl;
$R_4$ is selected from the group consisting of hydrogen, lower alkyl, lower alkoxy, fluorine and trifluoromethyl;
$R_5$ is selected from the group consisting of hydrogen, hydroxy, lower alkyl, lower alkoxy, nitro, amino, lower alkylamino, di(lower alkyl)amino, lower alkanoylamino, lower alkanoyl, bis-(hydroxy lower alkyl)amino, pyrrolidino, N-methylpiperazino, morpholino, cyano, amino lower alkyl, trifluoromethyl, halogen, di(lower alkyl)sulfamyl, benzylthio, lower alkylbenzylthio, lower alkoxybenzylthio, halogenobenzylthio, benzyloxy, lower alkylbenzylthio, lower alkoxybenzyloxy, halogenobenzyloxy, lower alkenyl, lower alkenyloxy, hexamethyleneimino, cyclopropyl, cyclopropyl(lower alkoxy) and cyclobutyl(lower alkoxy);
A is selected from the group consisting of benzoyl, naphthoyl, biphenoyl and HetC=O wherein Het is selected from the group consisting of furyl, isonicotinyl, thienyl, pyrryl, thiazolyl, thiadiazolyl, pyrazinyl, pyridinyl, quinolyl, isoquinolyl, pyrazolyl, imidazolyl, oxazolyl, pyrimidinyl, benzisooxazolyl, benzimidazolyl, benzofuranyl, benzothiazolyl, benzotriazolyl, benzoxazolyl, benzothienyl, indazolyl, isoindazolyl, and substituted benzoyl, naphthoyl, biphenoyl and HetC=O wherein said substituent is selected from the group consisting of lower alkoxy, trifluoromethylacetyl, di(lower alkyl) sulfamyl, difluoroacetyl, monofluoroacetyl, carb-lower alkoxy, formyl, trifluoromethylthio, lower alkyl sulfinyl, lower alkyl sulfonyl benzylthio, lower alkyl benzylthio, lower alkoxy benzylthio, halogenebenzylthio, mercapto, di(lower alkyl)amino, acetamino, halogen, methylthio, nitro, acetyl, di(lower alkyl)carboxamido, phenoxy, lower alkyl phenoxy, lower alkoxy phenoxy, halogenophenoxy, cyano and lower alkyl;

M is selected from the group consisting of hydroxyl, amino, methylamino, ethylamino, propylamino, butylamino, dimethylamino, diethylamino, N-methyl-N-ethylamino, N-methyl-N-butylamino, dibutylamino, glucosamino, glycosylamino, allylamino, N-phenethylamino, N-ethyl-N-phenethylamino, p-chloroanilino, β(1-ethyl-piperidyl-2)ethylamino, tetrahydrofurfurylamino, 1,2,5,6-tetrahydropyridino, morpholino, N-methyl piperazino, piperazino, N-phenylpiperazino, piperidino, benzylamino, anilino, p-ethoxyanilino, cyclohexylamino, pyrrolidino, N-hydroxyethylpiperazino, N,N-dimethylcarbamylmethylamino, N,N-diethylaminoethylamino, benzyloxy, lower alkoxy, p-methoxyanilino, (1-methylpyrrolidyl-2)methylamino, N-carbobenzyloxymethylamino, ethoxyethoxy, phenoxy, diphenylmethoxy, triphenylmethoxy, cyclopropyloxy, β - diethylaminoethoxy, β - dimethylaminoethoxy, β-acetaminoethoxy, phenethoxy, allyloxy, isopropoxy, cyclopropylmethoxy, tetrahydrofurfuryloxy, cyclohexyloxy, cyclopentyloxy, cyclopropylethoxy, p-acetaminophenoxy, o - carboxyphenoxy, polyhydroxy lower alkyl, polyhydroxy cycloalkyl and OZ where Z is a cation, and OY where Y represents lower alkyl, and the structure:

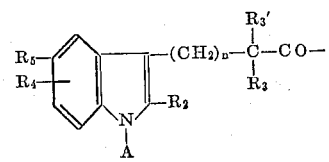

wherein $n$, A, $R_2$, $R_3$, $R_3'$, $R_4$ and $R_5$ are as defined above.

2. A compound of the formula:

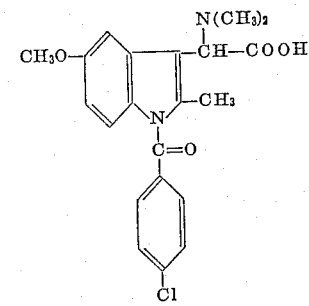

3. A compound of the formula:

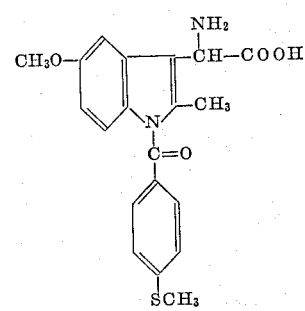

4. A compound of the formula:
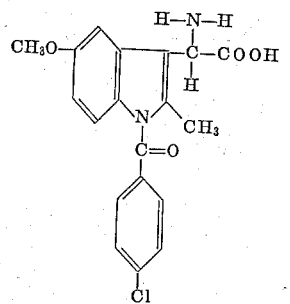
5. A compound of the formula:
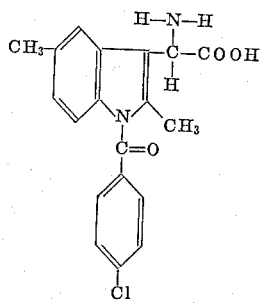
6. A compound of the formula:
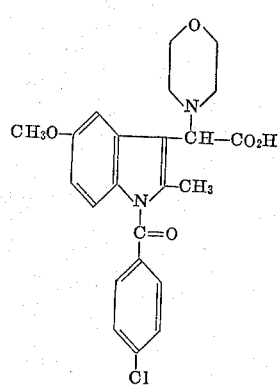
7. A compound of the formula:
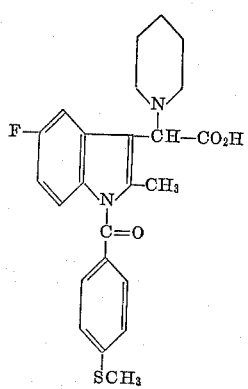
8. A compound of the formula:
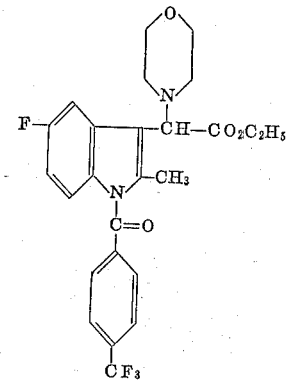
9. A compound of the formula:
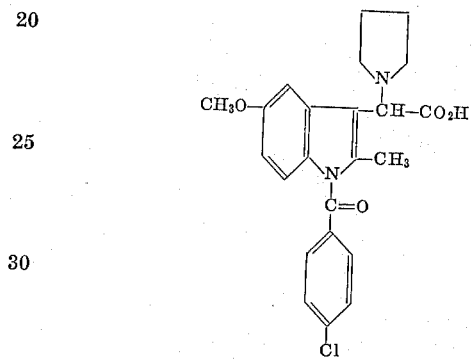
10. A compound of the formula:
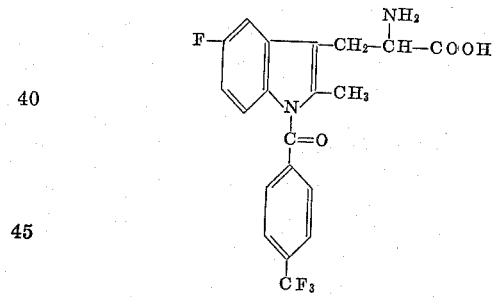
11. A compound of the formula:
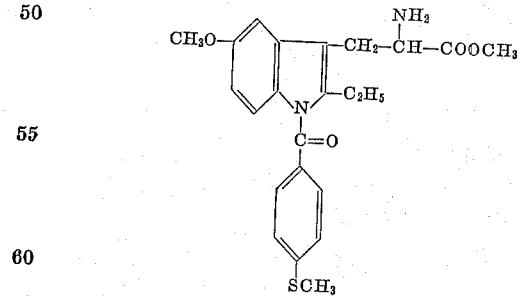
12. A compound of the formula:
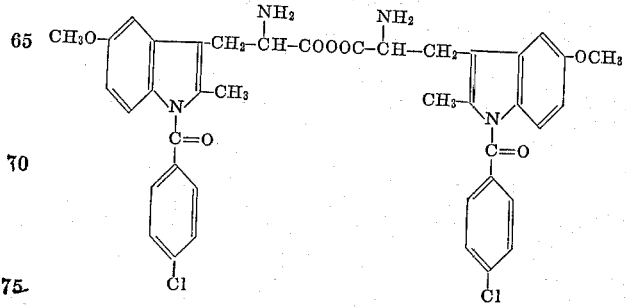

13. A compound of the formula:
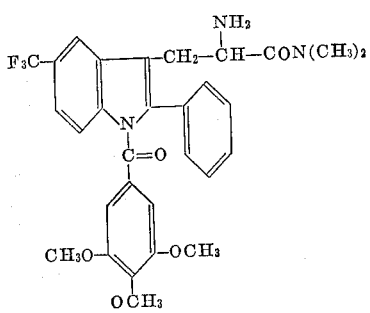
14. A compound of the formula:
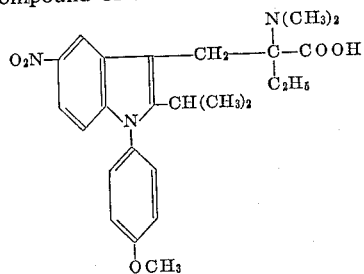
References Cited by the Examiner
Mamaey et al.: Chemical Abstracts, vol. 55, page 27105d (1961), QD 1 A 563.
ALEX MAZEL, *Primary Examiner.*
J. TOVAR, *Assistant Examiner.*